United States Patent [19]
Saito et al.

[11] Patent Number: 5,729,777
[45] Date of Patent: *Mar. 17, 1998

[54] PHOTOGRAPHIC CAMERA SYSTEM

[75] Inventors: Takahiko Saito, Kanagawa; Akira Nakanishi; Shunzi Obayashi, both of Tokyo; Hideki Toshikage, Saitama, all of Japan

[73] Assignee: Sony Corporation, Tokyo, Japan

[*] Notice: The term of this patent shall not extend beyond the expiration date of Pat. No. 5,583,591.

[21] Appl. No.: 756,599

[22] Filed: Nov. 27, 1996

Related U.S. Application Data

[60] Division of Ser. No. 444,681, May 19, 1995, Pat. No. 5,600,386, which is a continuation-in-part of Ser. No. 329,546, Oct. 26, 1994, Pat. No. 5,583,591, which is a continuation-in-part of Ser. No. 26,415, Mar. 4, 1993, abandoned.

[30] Foreign Application Priority Data

Mar. 17, 1992 [JP] Japan .................. 4-060684
Mar. 23, 1992 [JP] Japan .................. 4-065304

[51] Int. Cl.⁶ .................................................. G03B 17/24
[52] U.S. Cl. .................... 396/311; 396/429; 396/435; 355/40
[58] Field of Search .............................. 396/310, 311, 396/435, 436, 429; 355/40

[56] References Cited

U.S. PATENT DOCUMENTS

| | | | |
|---|---|---|---|
| 3,490,844 | 1/1970 | Sapp, Jr. | 396/311 |
| 4,977,419 | 12/1990 | Wash et al. | 396/311 |
| 5,382,508 | 1/1995 | Ikenoue. | |
| 5,453,815 | 9/1995 | Yoshikawa. | |
| 5,471,265 | 11/1995 | Shibata et al.. | |
| 5,583,591 | 12/1996 | Saito et al. | 396/311 |
| 5,600,386 | 2/1997 | Saito et al. | 396/311 |

*Primary Examiner*—David M. Gray
*Attorney, Agent, or Firm*—Jay H. Maioli

[57] ABSTRACT

A photographic camera system includes a photographic camera that can successively expose a photographic film in different frame sizes and an automatic printer for automatically printing the processed photographic film exposed with those different frame sizes. The camera varies the aspect of an exposure opening in the camera body and the film is fed for a length corresponding to the selected aspect by detecting a hole located in a marginal area of the film. The photographic camera magnetically or optically records at a location away from the hole an aspect information signal indicative of the selected aspect of the exposed frame on the photographic film, and the automatic printer automatically prints the photographic film using the magnetically or optically recorded aspect information signal detected from the photographic film.

23 Claims, 21 Drawing Sheets

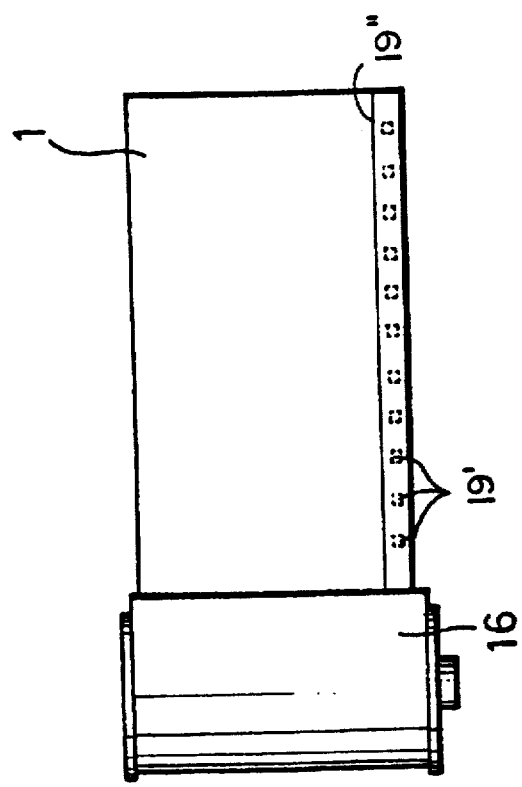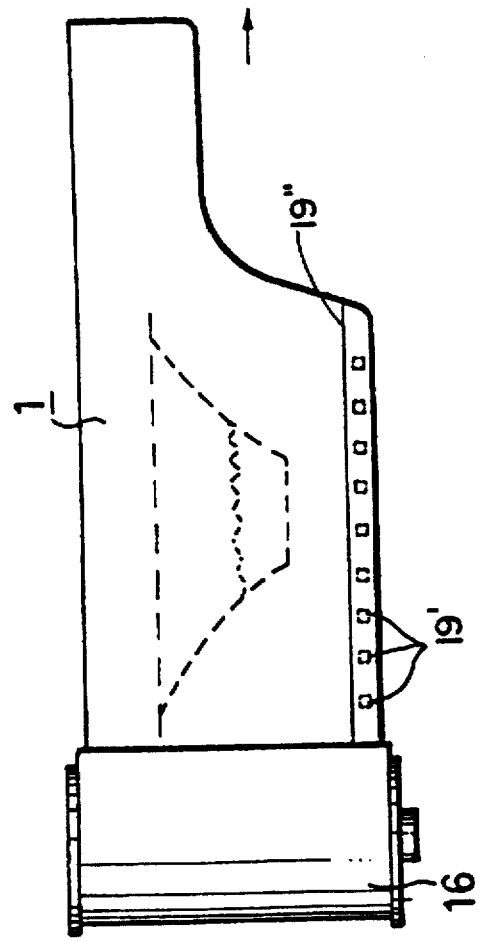
FIG.4A
FIG.4B

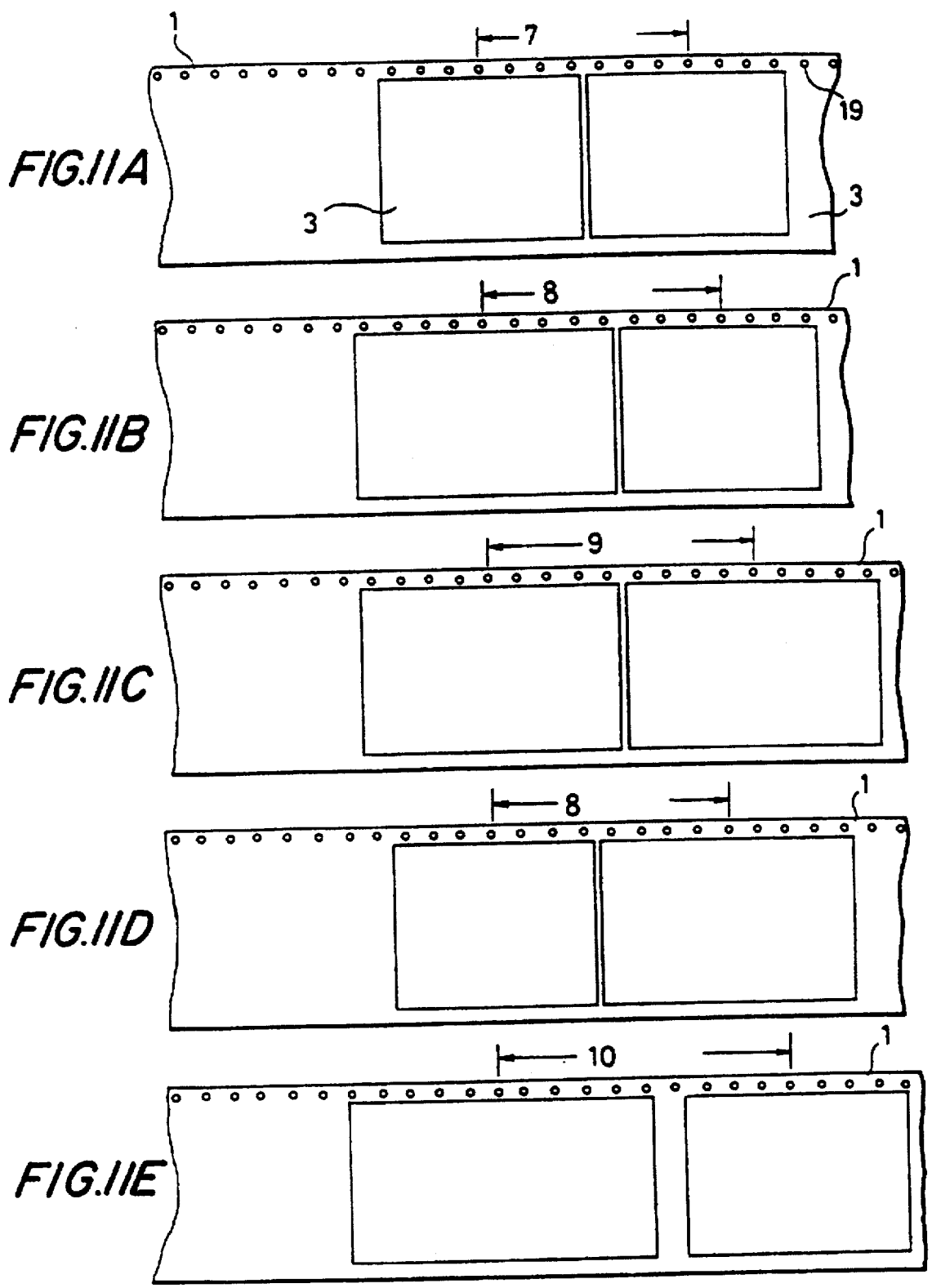

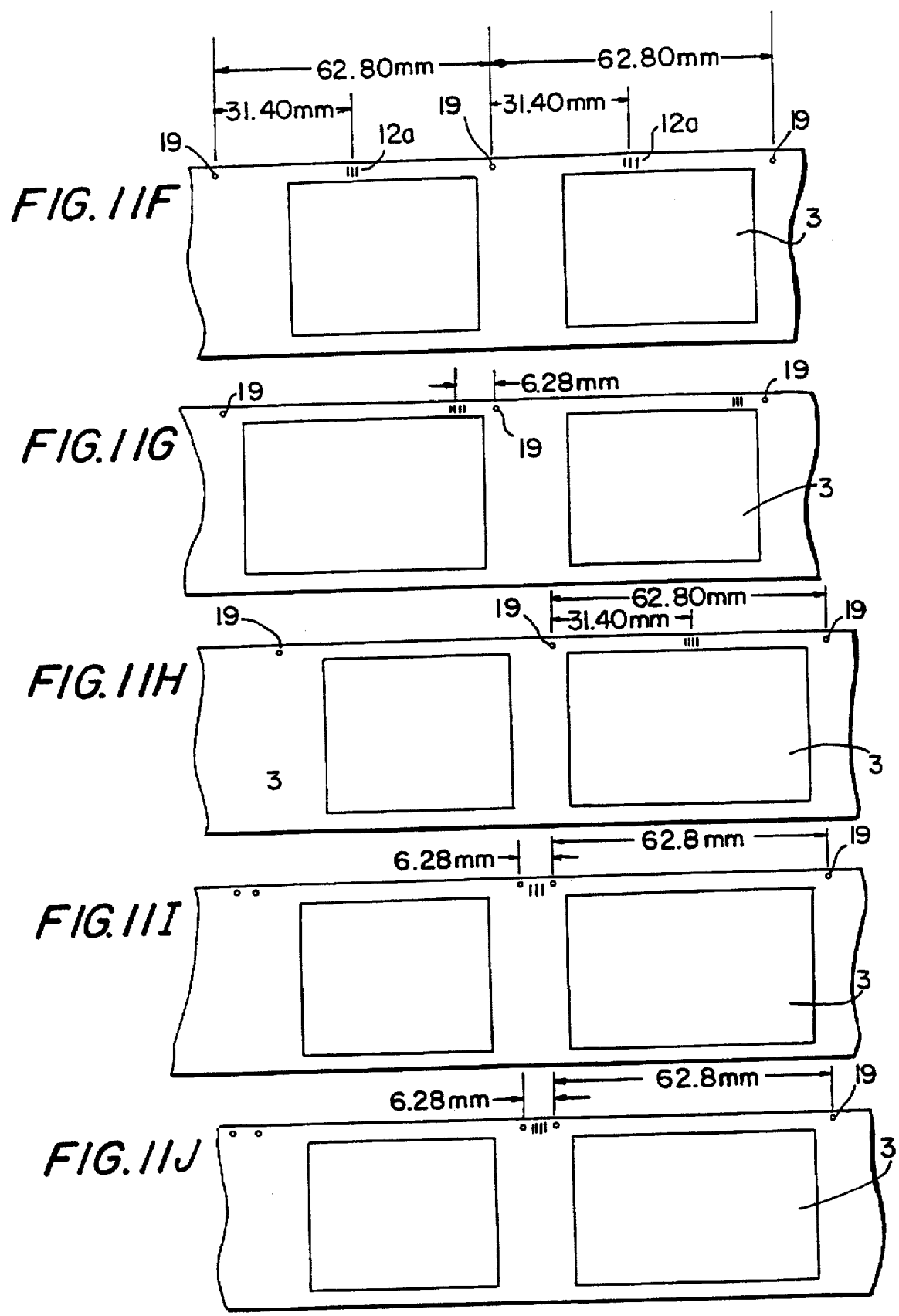

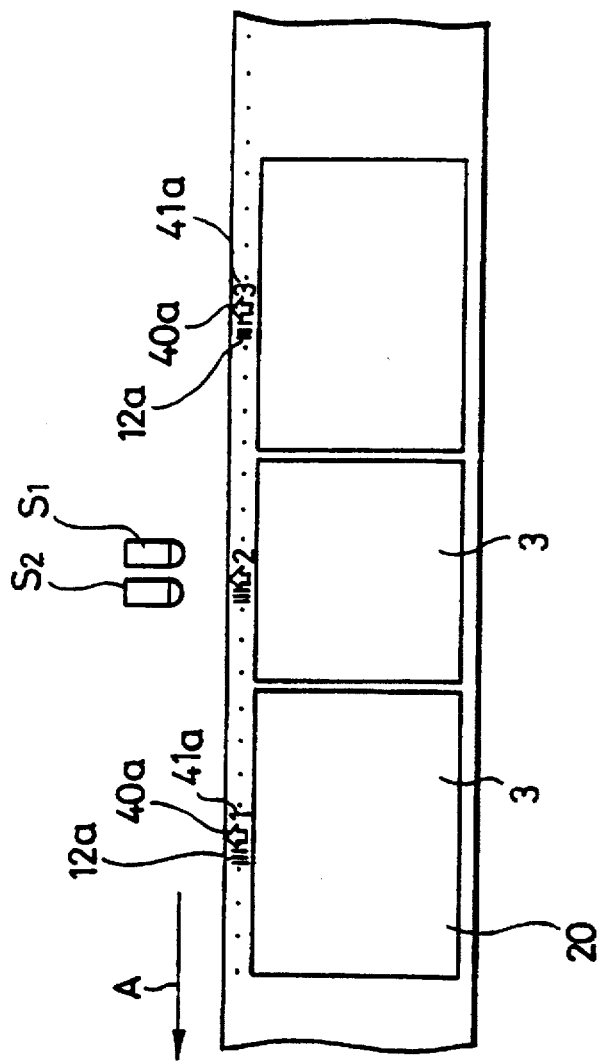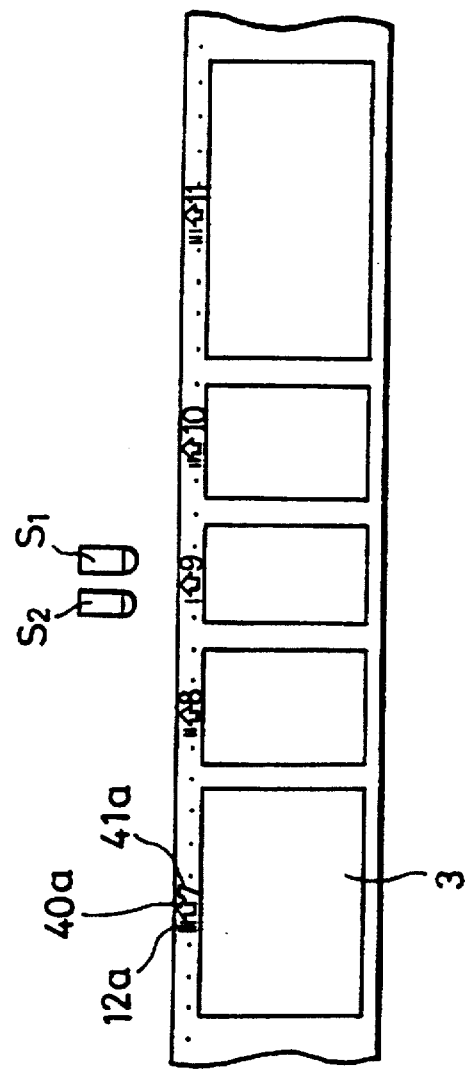

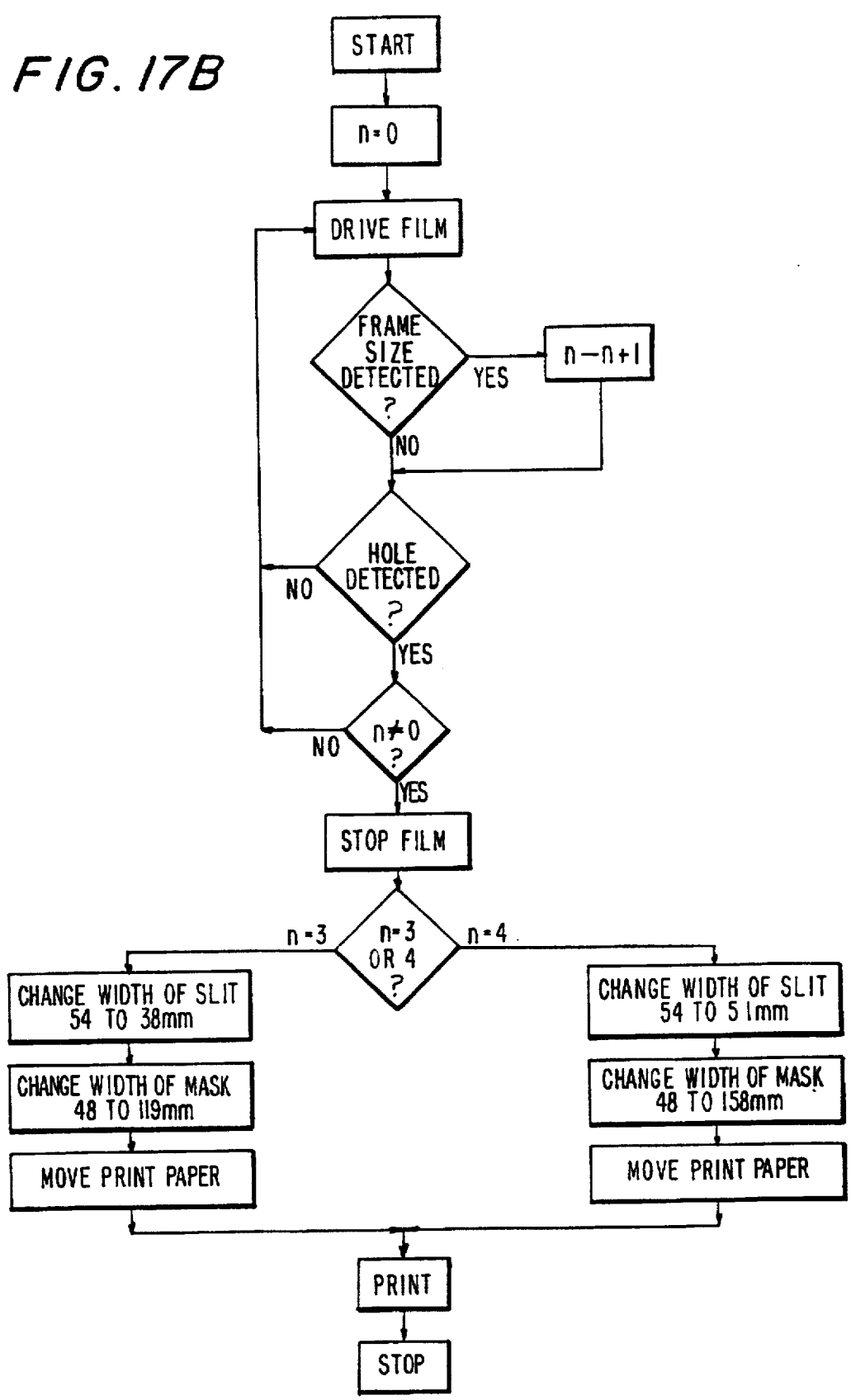

PHOTOGRAPHIC CAMERA SYSTEM

This application is a division of application Ser. No. 08/444,681 filed May 19, 1995, now U.S. Pat. No. 5,600,386 which is a continuation in part of application Ser. No. 08/329,546 filed Oct. 26, 1994, now U.S. Pat. No. 5,583,591 which is a continuation in part of application Ser. No. 08/026,415 filed Mar. 4, 1993, now abandoned.

BACKGROUND OF THE INVENTION

1. Field of the Invention

The present invention relates to a photographic camera system for producing pictures having various frame sizes, and more particularly to a photographic camera using a specialized photographic film and a film printing device for printing the processed photographic film having a succession of frames of different sizes that have been photographed by the camera.

2. Description of the Background

The photographic film that is in the most widespread use today is 35-mm film (system 135) as provided for by Japanese Industrial Standards (JIS) and international Organization of Standardization (IOS).

U.S. Pat. No. 5,049,908 describes a photographic camera and a film therefor, with the film being of a 35-mm size devoid of sprocket holes of the size used in present 35-mm films and having an effective image area of about 30 mm across the film, thereby providing an increased effective usable film area.

More specifically, ignoring dimensional tolerances, present 35-mm films for use in general photography have a width of 35 mm between opposite longitudinal edges and include a series of film-transport perforations or sprocket holes defined along the opposite longitudinal edges of the film. The film-transport perforations are spaced 25 mm across the film and have a pitch of 4.75 mm. Frames on such a present 35-mm film are of a rectangular shape having a width of 25 mm across the film and a length of 36 mm along the film. The frames have a pitch of 38 mm, which is eight times larger than the pitch of the film-transport perforations.

As described in U.S. Pat. No. 5,049,908, some modern photographic film cameras are electronically controlled to provide motor-driven operation with high accuracy, and it has been experimentally confirmed that the film can be transported quite accurately without requiring the large sprocket wheels and film perforations that are found in most present cameras and films. In the system described in U.S. Pat. No. 5,049,908, the film-transport perforations are not present in the 35-mm photographic film, thereby increasing the available frame width across the film up to the regions where such film-transport perforations were located. The proposed film thus has an increased effective image area for improved image quality. This patent describes four sizes that are available for frames that can be exposed on a 35-mm film free of film-transport perforations.

According to one size, a frame that can be exposed in an effective image area of the 35-mm film has a width of 30 mm across the film and a length of 40 mm along the film. The frames of such a size have a pitch of 42.0 mm, for example. The frame size and pitch are selected to match specifications of the present television broadcasting system, for example, the NTSC system. Therefore, the frames have an aspect ratio of 3:4.

Another frame size described in that patent is based on High-Definition Television (HDTV) specifications, in which frames have a width of 30 mm and a length of 53.3 mm and a pitch of 57.75 mm, for example. The aspect ratio of the frames having that size is 9:16.

The above-mentioned frame sizes are full-frame sizes, and the other two frame sizes are half-frame sizes. According to one of the half-frame sizes, frames have a width of 30 mm and a length of 22.5 mm and a pitch of 26.2 mm, for example, to match present television broadcasting system specifications. According to the other half-frame size, frames have a width of 30 mm and a length of 16.9 mm and a pitch of 21.0 mm, for example, to match HDTV specifications.

Film with the above four frame formats is stored in the same film cartridge as presently available 35-mm film.

Because the frames in either of the above frame formats have a width of 30 mm, there are unexposed areas of about 2.5 mm between the frames and along the opposite longitudinal edges of the film. These unexposed areas may be used to keep the film flat, control the film, and write and read data when taking pictures.

The proposed camera may be relatively small and lightweight, because it does not require film-transport sprocket wheels.

Films that are actually collected in processing laboratories are processed either simultaneously in a batch or individually. In a simultaneous batch process, several thousand films are processed per hour at a high rate to realize economics of scale for reducing the printing cost. Specifically, a plurality of exposed films are collected in the processing laboratory and are spliced end to end to form a long, continuous film strip, which is then stored in a film magazine and subsequently processed.

If the films that are spliced into the continuous strip contain frames exposed in different frame formats, Such as disclosed in U.S. Pat. No. 5,049,908, then the long single film stored in the film magazine contains different frame sizes, thereby making printing a problem.

U.S. Pat. Nos. 4,384,774 and 5,066,971 propose cameras capable of switching between half and full frame sizes at the time the film is exposed. When film exposed using these proposed cameras is spliced into a long, single, film strip for simultaneous batch processing, the continuous film strip also contains different frame sizes.

The processing laboratories are therefore required to form notches indicative of frame centers for automatically printing spliced films with different frame sizes after they are developed. For example, as disclosed in U.S. Pat. No. 4,557,591, a human operator manually notches a side edge of a spliced film and, hence, the notches are required to control the feed of the film. With the disclosed process, it is impossible to process several thousand films per hour, however, the cost of processing exposed film is relatively high. As a consequence, films with different frame sizes may not be accepted by processing laboratories in Japan.

Many processing laboratories all over the world also do not accept films with frames exposed in half size because they do not want different frame sizes to be contained in a single spliced film that is stored in a single film magazine for subsequent processing and printing. This problem arises because the different frame sizes can be recognized only after the film has been developed. One solution would be to apply marking seals to exposed films so that the films of different frame sizes thereof can be distinguished and sorted out for individual processing and printing. Nevertheless, use of marking seals would not essentially solve the problem, because it would be difficult to supply such marking seals consistently over a number of years.

OBJECTS AND SUMMARY OF THE INVENTION

Accordingly, it is an object of the present invention to provide a variable frame size photographic system that can eliminate the above-noted drawbacks inherent in prior proposed systems.

It is another object of the present invention to provide a photographic camera that can expose a photographic film in different frame sizes as desired.

Another object of the present invention is to provide a photographic film printer for automatically printing successive photographic films, even if they contain different frame sizes.

According to one aspect of the present invention, there is provided a photographic camera system including a photographic camera having a camera body, a first housing disposed in the camera body for housing a photographic film cartridge, a second housing disposed in the camera body for housing a photographic film drawn from the photographic film cartridge, a film feed device disposed in the camera body for feeding the photographic film between the first and second housings by detecting a hole located in a marginal edge of the film, an exposure device disposed in the camera body for exposing an exposure area of the photographic film fed by the film feed device to an image of a subject between the first and second housings, and a recording device disposed in the camera body for optically or magnetically recording an aspect information signal away from a hole and indicating a selected aspect of the exposure area. The photographic camera system also includes a photographic film printer having a printer body, a light source and a variable mask system, a detecting device disposed on the printer body for detecting the hole and generating a hole detecting signal and detecting the aspect information that was optically or magnetically recorded on the photographic film for generating an aspect information signal, a film feed control device disposed on the printer body for controlling feeding of the photographic film based on the exposure position control signal detected by the hole detecting signal, and a printing device disposed on the printer body for varying an opening width of a mask that is used to print the image of the subject in the exposure area of the photographic film on a print paper, depending on the aspect information signal.

According to another aspect of the present invention, there is also provided a photographic camera including a first housing for housing a photographic film cartridge, a second housing for housing a photographic film drawn from the photographic film cartridge, a film feed device for feeding the photographic film between the first and second housings and positioning a frame for exposure by detecting a hole formed in a marginal edge of the film, an exposure device for exposing an image of a subject to be recorded on the photographic film, and a recording device for optically or magnetically recording aspect information indicative of the aspect of the frame at a position away from the hole.

The present invention in another aspect also provides a photographic film printer for printing on photosensitive photographic paper a processed photographic film including a printer body, a light source and a variable mask system mounted on the printer body for exposing the photographic paper, a detecting device disposed on the printer body for detecting a hole formed in a marginal area of the processed photographic film and generating a detecting hole signal and for detecting aspect information recorded on the processed photographic film and generating a detected aspect information signal, a film feed control unit disposed on the printer body for controlling feeding of the processed photographic film based on the hole detecting signal detected by the detecting device, and a printing device disposed on the printer body for varying an opening width of the variable mask system that is used to print an image of a subject in an exposure area of the photographic film on a print paper, depending on the detected aspect information signal.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 4A and 4B are elevational views of 35-mm film cartridges that can be used in another embodiment of the 35-mm photographic camera of the present invention;

FIGS. 11A through 11J are fragmentary front elevational views showing the positional relationships of frames exposed on a 35-mm film using the 35-mm photographic camera according to the present invention;

FIGS. 16A through 16D are fragmentary front elevational views showing the relationship between a 35-mm film and sensors in the automatic printer shown in FIG. 13;

FIGS. 17A and 17B are flowcharts of a program that is performed by a microprocessor of the control system shown in FIG. 14;

DETAILED DESCRIPTION OF PREFERRED EMBODIMENTS

Figure 1:
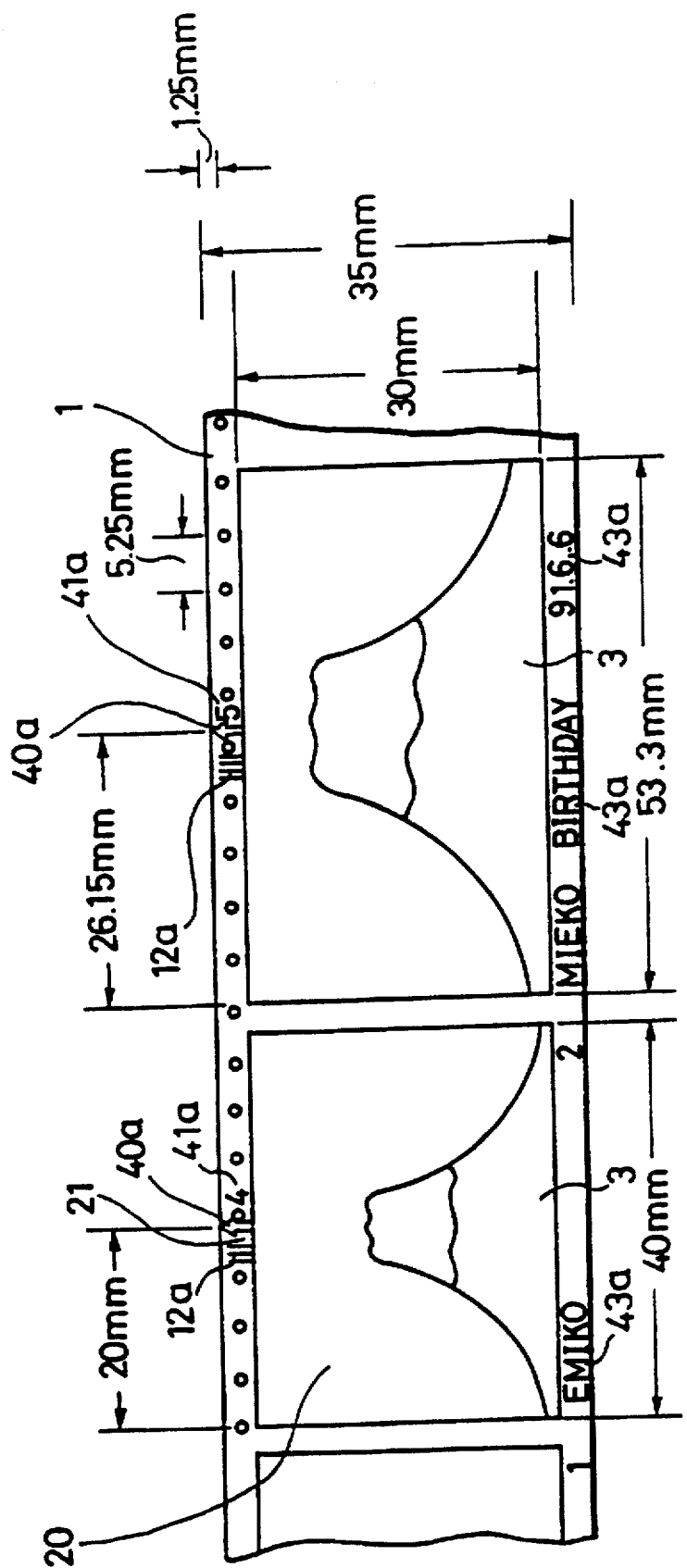
FIG. 1 is a fragmentary front elevational view of a 35-mm film that has been exposed using a 35-mm photographic camera according to an embodiment of the present invention.
Figure 2:
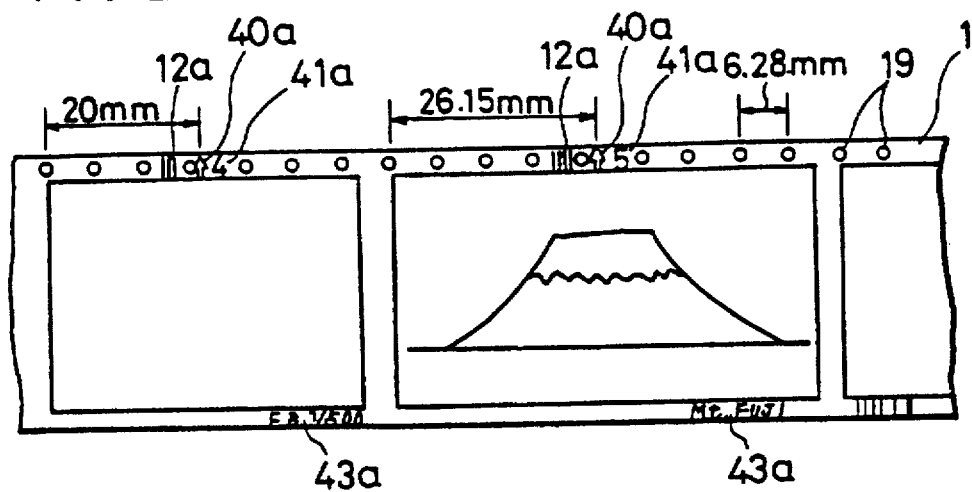
FIG. 2 is a fragmentary front elevational view of another 35-mm film that has been exposed using an embodiment of the 35-mm photographic camera of the present invention.
Figure 3A:
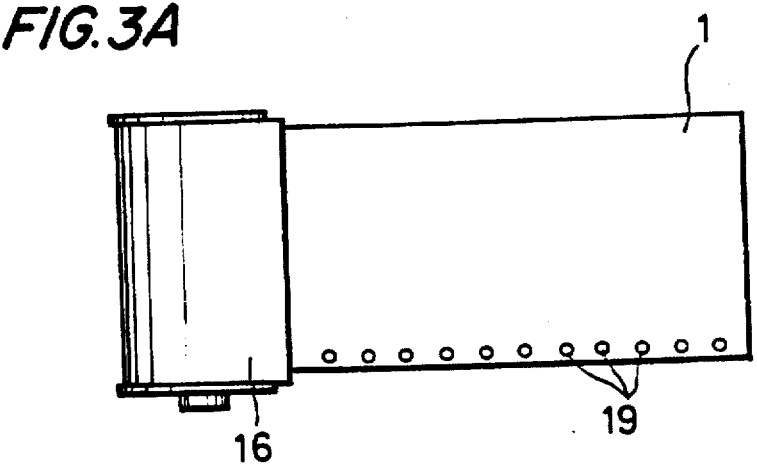
FIGS. 3A and 3B are elevational views of 35-mm film cartridges that can be used in one embodiment of the 35-mm photographic camera of the present invention.
Figure 3B:
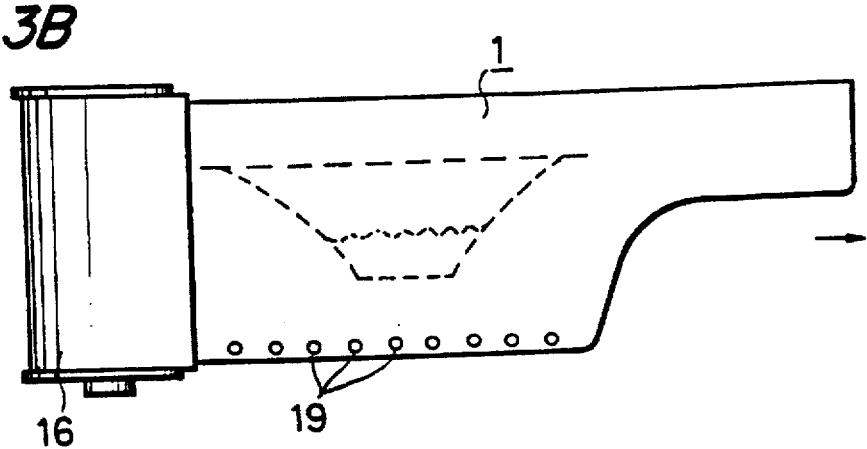

A 35-mm photographic film 1 that can be used in a 35-mm photographic camera according to the present invention is described with reference to FIGS. 1, 2, 3A, and 3B, in which FIGS. 1 and 2 show 35-mm photographic film 1 after it has been exposed, and FIGS. 3A and 3B show 35-mm photographic film 1 before being exposed.

As shown in FIGS. 3A and 3B, the 35-mm photographic film 1 is stored in a film cartridge 16 and has an end extending out of the film cartridge 16. Images that are photographed on the 35-mm photographic film 1 are turned upside down by the lenses, so that the upper end of an image is positioned on a lower portion of the photographic film 1. FIG. 3B shows by way of example a photographed image of a subject in broken lines, which appears to be turned upside down on the photographic film 1.

Each of the photographic films 1 shown in FIGS. 1, 2, 3A, and 3B has a series of film position detecting holes 19 defined along an unexposed marginal edge area thereof, which has a width of about 2.5 mm. This unexposed marginal area is used to control the film, to read data, and to write data when taking a picture. The film position detecting holes 19 have a diameter of about 1 mm and are spaced at a constant, predetermined pitch. The pitch of the film position detecting holes 19 in the photographic film 1 shown in FIG. 1 is 5.25 mm, for example, and the pitch of the film position detecting holes 19 in the photographic film 1 shown in FIG. 2 is 6.28 mm.

The film position detecting holes 19 can be replaced by magnetic marks 19' spaced at a predetermined constant pitch and made by a suitable magnetic head on a magnetic edge portion 19" formed on the unexposed film. The magnetic marks 19' are shown as broken lines on the magnetic strip 19" in FIGS. 4A and 4B, because they are not actually visable. Alternatively, the marks 19' could be formed as small dots of magnetic material, such as iron oxide, deposited on the unexposed film and detected by the magnetic head.

Distances by which the different photographic films 1 with the film position detecting holes 19 or magnetic marks 19' spaced at the pitches of 5.25 mm and 6.28 mm are advanced to feed frames of different frame sizes are given in Table 1 below.

TABLE 1

| Frame sizes (Width × length) | Pitch-6.28 mm | Pitch = 5.25 mm |
| --- | --- | --- |
| NTSC-matched frame size (30 mm × 40 mm), full size | 43.96 = 6.28 × 7 pitches | 42.0 = 5.25 × 8 pitches |
| HDTV-matched frame size (30 mm × 53.3 mm), full size | 56.52 = 6.28 × 9 pitches | 57.75 = 5.25 × 11 pitches |
| HDTV-matched frame size (30 mm × 16.9 mm), half size | 18.84 = 6.28 × 3 pitches | 21.0 = 5.25 × 4 pitches |
| NTSC-matched frame size (30 mm × 22.5 mm), half size | 25.12 = 6.28 × 4 pitches | 26.25 = 5.25 × 5 pitches |

The photographic film 1 shown in FIG. 3A has film position detecting holes 19 that will be positioned along an upper marginal edge area after the photographic film is exposed, however, no tongue is provided at the leading end, so that no tongue-removing process will subsequently be required. Because no tongue-removing process will be required, the subsequent processing of the photographic film 1 is less costly. This applies to the film shown in FIG. 4A as well.

The photographic film 1 shown in FIG. 3B also has film position detecting holes 19 that will be positioned in an upper marginal edge area thereof after the photographic film is exposed, and has a tongue at its leading end on its lower portion. The tongue at the leading end of the photographic film 1 is vertically opposite in position to the tongue of an ordinary 35-mm photographic film that is now generally commercially available. If a photocoupler is used in a photographic camera for detecting the film position detecting holes 19, then when the photographic film 1 is loaded into the photographic camera, the marginal edge with the film position detecting holes 19 is not required to be manually inserted into the photocoupler, but is automatically inserted into the photocoupler when the photographic film 1 is wound by a film transport mechanism in the photographic camera. This also applies to the film shown in FIG. 4B.

Figure 5:
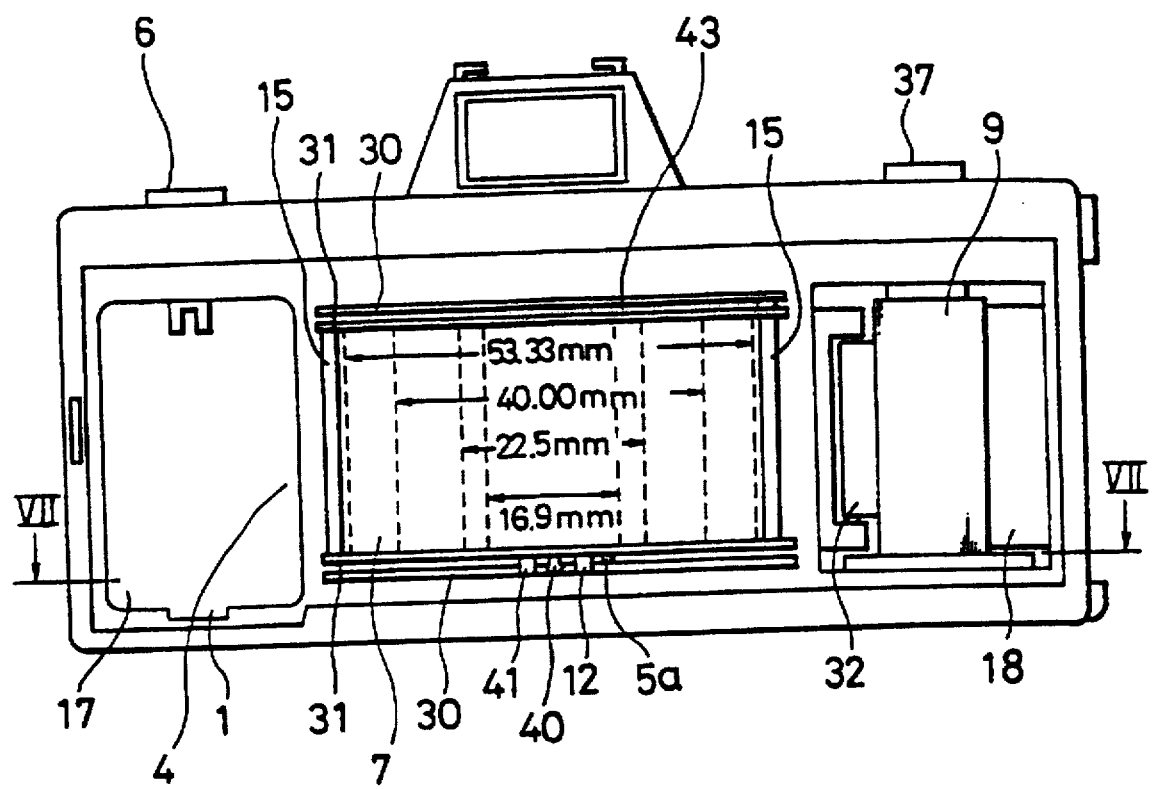
FIG. 5 is a rear elevational view of the 35-mm photographic camera of one embodiment of the present invention with a rear lid removed.
Figure 6:
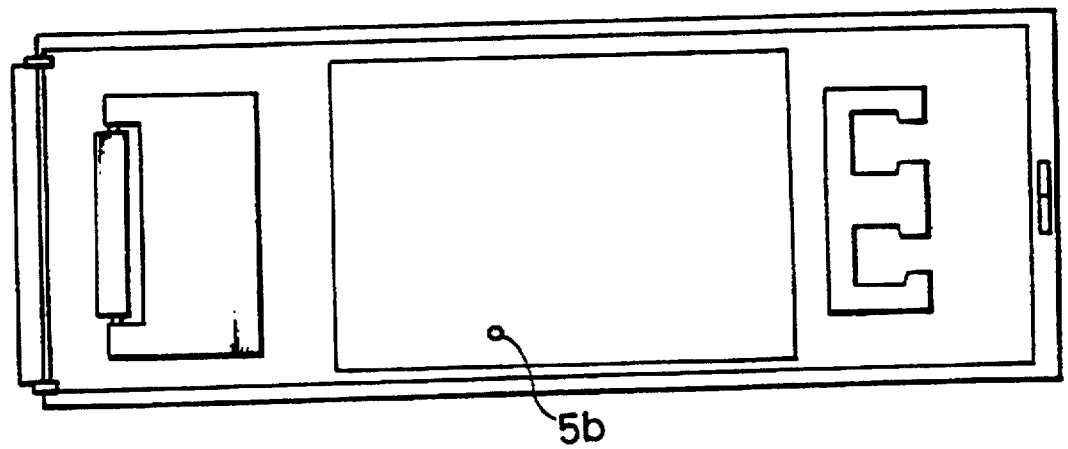
FIG. 6 is an elevational view of an inner surface of a rear lid of the 35-mm photographic camera of FIG. 5.

An embodiment of a photographic camera that can use the photographic films 1 shown in FIGS. 1, 2, 3A, and 3B is shown and described with reference to FIGS. 5 through 8 and 10. FIG. 5 is a rear elevation of the photographic camera with the rear lid or cover removed. The lid is shown in FIG. 6. The photographic camera has a dark box 4 including a cartridge housing 17 for housing the film cartridge 16, which is of a known structure, an exposure opening 7 near the cartridge housing 17 and through which the photographic film 1 can be exposed to light passing through a camera lens, aperture, and shutter not shown in FIG. 5, and a film housing 18 for housing the photographic film 1 after it has been exposed.

The photographic film 1 that is unwound from the film cartridge 16 housed in the cartridge housing 17 is fed over the exposure opening 7 while being transversely limited in motion by upper and lower respective pairs of film guides 30, 31, and is then moved into the film housing 18 after being exposed.

Figure 8:
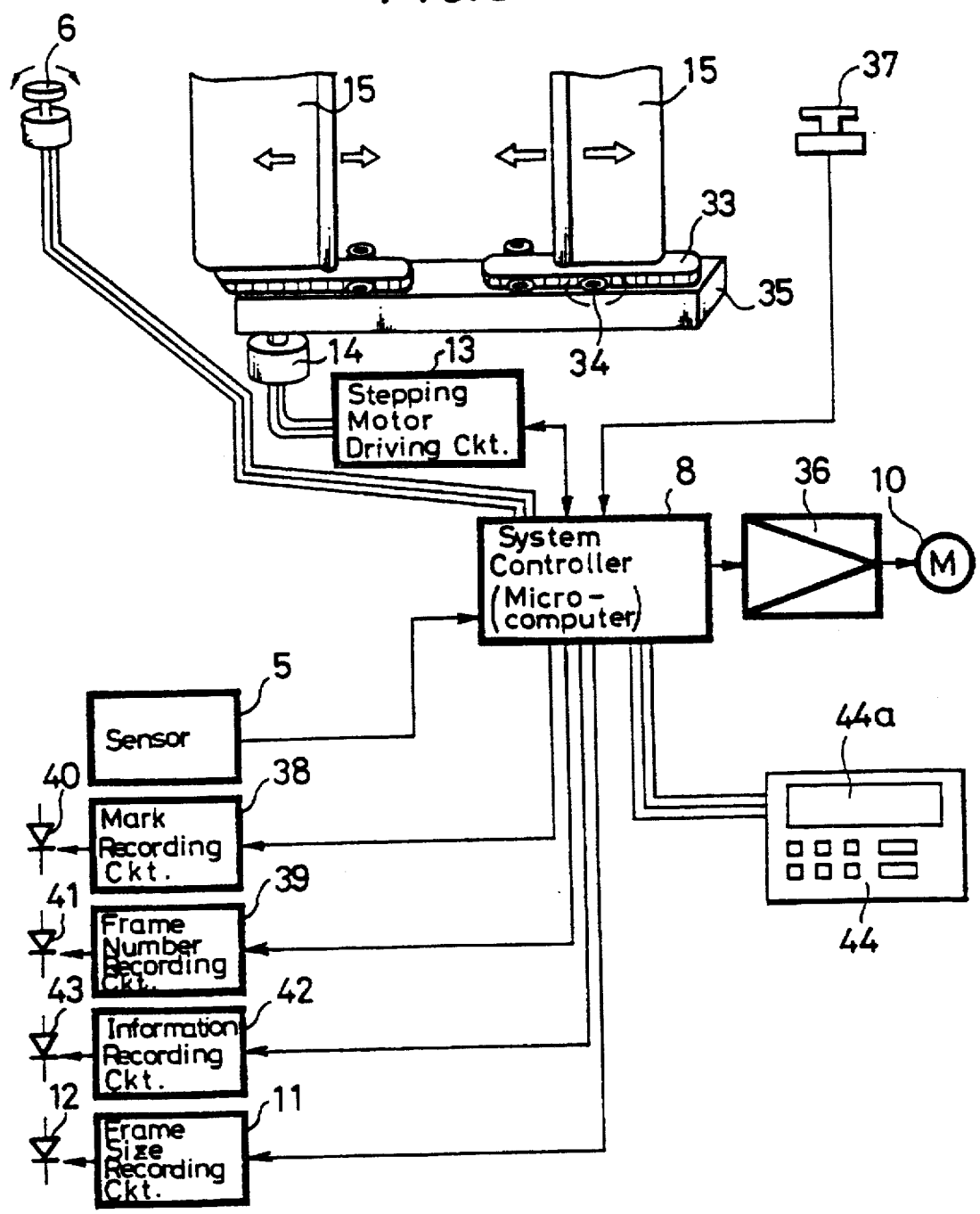
FIG. 8 is a block diagram of a control system for one embodiment of the 35-mm photographic camera according to the present invention using the film of FIGS. 3A and 3B.

The film housing 18 has a guide roller 32 for automatically setting or loading the photographic film 1, and a film takeup spool 9 rotatable by a motor, shown at 10 in FIG. 8, for winding the exposed photographic film 1 thereon.

The photographic camera has a light-emitting diode (LED) 5a positioned between the lower film guides 30, 31 for detecting the film position detecting holes 19, and a photodetector, shown in FIG. 6 at 5b, disposed on a pressure plate of the rear lid and positioned in registry with the LED 5a across the photographic film 1. The photodetector 5b has a diameter of 1.5 mm, for example.

The LED 5a emits infrared radiation having a wavelength of 940 nm, which is different from those radiation wavelengths to which the photographic film 1 is sensitive. Referring to FIG. 8, the LED 5a and the photodetector 5b jointly make up a hole sensor 5 that applies an output signal to a counter in a system controller 8 that comprises a microcomputer. In this way, the system controller 8 can recognize the position of the photographic film 1 over the exposure opening 7. The LED 5a and the photodetector 5b may be alternatively replaced with a photocoupler that also comprises an LED and a photodetector but which are positioned in confronting relationship, as described hereinbelow.

Figure 9:
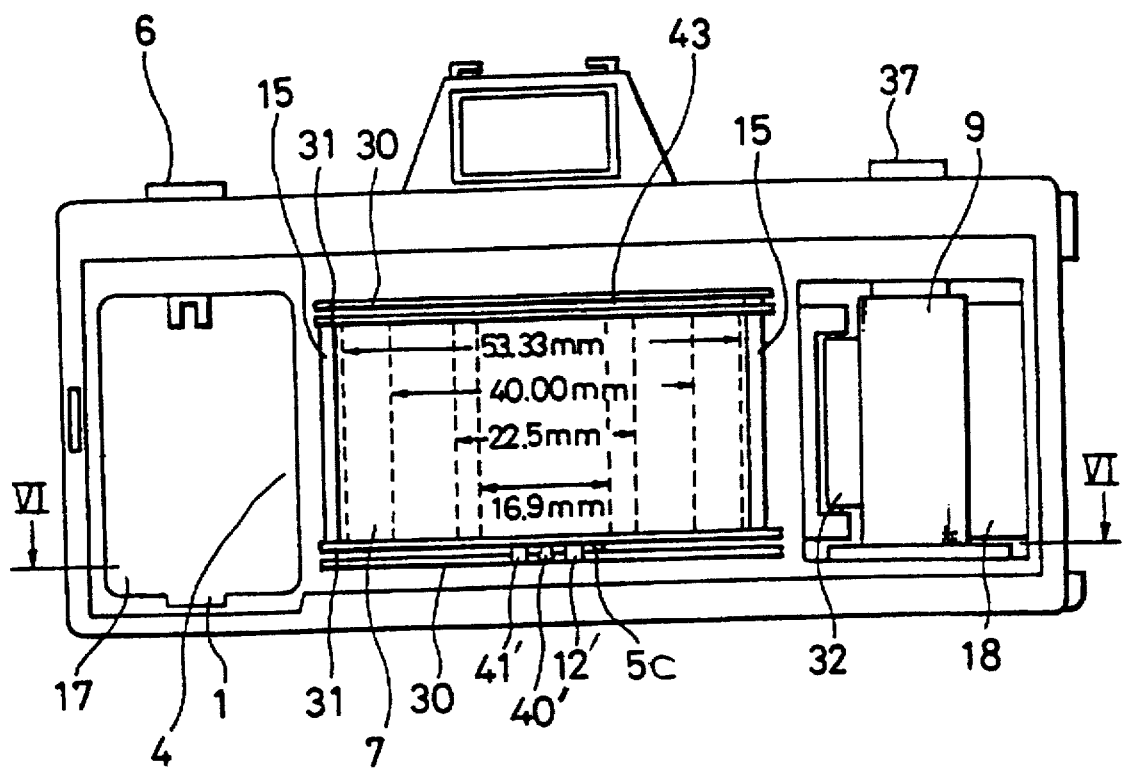
FIG. 9 is a rear elevational view of the 35-mm photographic camera of another embodiment of the present invention with the rear lid removed.

Alternatively, as shown in FIG. 9 the LED 5a can be replaced by a magnetic head 5c that operates to sense the magnetic marks 19', shown in FIGS. 4A and 4B, that are on the marginal edge area 19" of the unexposed film.

In FIG. 5, the exposure area opening 7 has its size defined by left and right movable masks 15 that are laterally movable over the width of the exposure opening 7 from opposite sides thereof. The size of the exposure opening 7 in the longitudinal direction of the photographic film 1 can selectively be changed to four different dimensions of 53.33 mm, 40.00 mm, 22.5 mm, and 16.90 mm as indicated by the four pairs of broken lines in FIG. 5.

Figure 7:
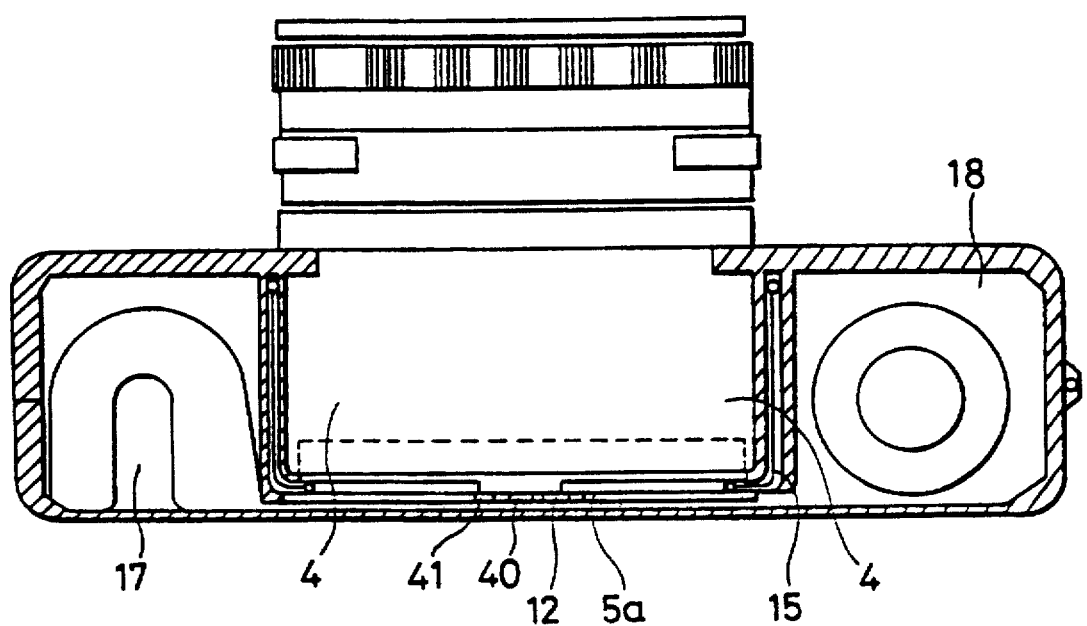
FIG. 7 is a cross-sectional view taken along line VII—VII of FIG. 5.
Figure 10:
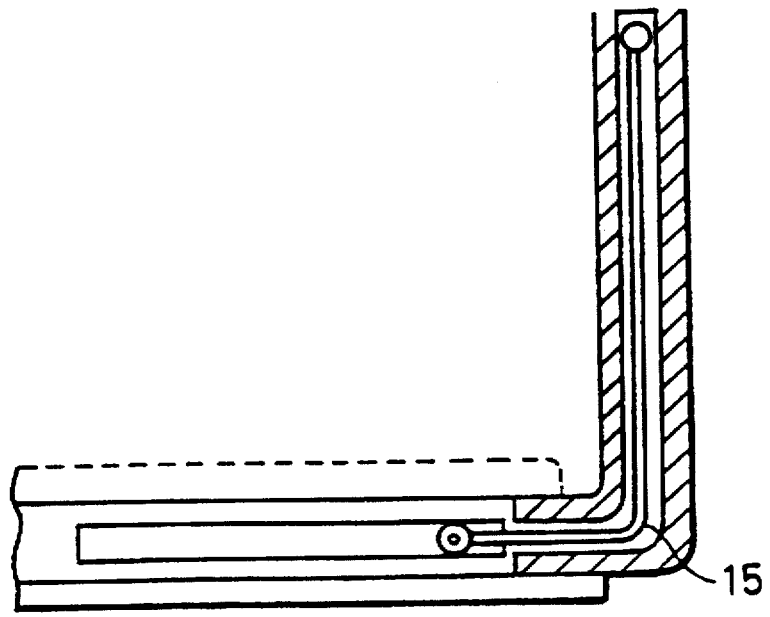
FIG. 10 is an enlarged fragmentary view of a portion of the camera shown in FIG. 7.

As shown in FIGS. 7 and 10, the left and right movable masks 15 are retractable into left and right side walls, respectively, that are positioned on opposite sides of the exposure opening 7 and extend substantially perpendicularly to the photographic film 1 as it extends over the exposure opening 7. As shown in FIG. 8, two linear toothed bars 33 are attached to the respective lower edges of the movable masks 15 and held in mesh with respective drive feed gears 34 of a gearbox 35, much like a rack and pinion assembly. When the gears 34 of the gearbox 35 are driven to rotate the linear toothed bars 33, and hence the movable masks 15, are linearly moved over the exposure opening 7.

As shown in FIGS. 5 and 7, the photographic camera has a frame size setting switch 6 which can manually be turned by the user of the camera to produce a command signal indicative of a selected frame size which is one of the frame sizes described above in Table 1. When the user selects a frame size with the frame size setting switch 6, the frame size setting switch 6 applies a command signal to the system controller 8, which then supplies a control signal to achieve the desired frame size through a stepping motor driving circuit 13 to a stepping motor 14. The stepping motor 14 is energized to rotate the feed gears 34 to move the movable masks 15. At the same time that the movable masks 15 move, the hole sensor 5 produces and supplies a detected film position signal to the system controller 8, which processes the supplied film position signal to generate a control signal. The system controller 8 then supplies the control signal through an amplifier 36 to a motor 10, which rotates the film spool 9 to take-up the photographic film 1 over a predetermined length.

At this time, the length over which the photographic film 1 is driven corresponds to the distance that is determined by the frame size setting switch 6. The feeding of the photographic film 1 is described below with reference to FIGS. 11A through 11E, which show examples in which the hole pitch is 6.28 mm and the photographic film 1 is to be exposed in an HDTV-matched full-frame size of 30 mm×53.3 mm and an NTSC-matched full-frame size of 30 mm×40 mm.

FIG. 11A shows a portion of the photographic film 1 as it is exposed in successive NTSC-matched full frames. When the photographic film 1 is fed for seven pitches of the holes 19, a frame area of 30 mm×40 mm is made available for exposure through the exposure opening 7. To switch from an NTSC-matched full-frame size to an HDTV-matched full-frame size, the photographic film 1 is fed for eight pitches of the holes 19, as shown in FIG. 11B, to make a frame area of 30 mm×53.3 mm available for exposure through the exposure opening 7. To expose the photographic film 1 in successive HDTV-matched full frames, the photographic film 1 is fed for nine pitches of the holes 19, as shown in FIG. 11C, to make a frame area of 30 mm×53.3 mm available for exposure through the exposure opening 7. To switch from an HDTV-matched full-frame size to an NTSC-matched full-frame size, the photographic film 1 is fed for eight pitches of the holes 19, as shown in FIG. 11D, to make a frame area of 30 mm×40 mm available for exposure through the exposure opening 7.

To change frame sizes, the system controller 8 controls the motor 10 as follows: When switching from an NTSC-matched full-frame size to an HDTV-matched full-frame size, the photographic film 1 is first driven for seven pitches of the holes 19 and is then driven for one additional hole pitch. When switching from an HDTV-matched full-frame size to an NTSC-matched full-frame size, the photographic film 1 is first driven forward for nine pitches of the holes 19 and is then driven backward for one pitch.

When changing frame sizes, the photographic film 1 may be driven for a different distance or a different number of pitches, such as ten pitches of the holes 19, as shown in FIG. 11E. FIG. 11E shows the photographic film 1 being constantly fed for a length equal to ten pitches of the holes 19. If the film cartridge can accommodate an increased length of film and the film can be used to record extra length frames, this constant length feeding approach is suitable for combinations of an HDTV-matched full-frame format and an NTSC-matched full-frame format along the length of the film. This constant length feeding can be also used with the film as shown in FIGS. 11F and 11G.

As illustrated in FIG. 11F, FIG. 11G and FIG. 11H, the distance between the holes 19 in these three figures corresponds to ten pitches of the holes 19 in FIG. 11A. FIG. 11F shows a photographic film 1 as it is exposed in successive NTSC-matched full-frames. A frame-size signal 12a is recorded in a center of pitches between holes 19. To switch from an NTSC-matched full-frame to an HDTV-matched full frame, the photographic film 1 is fed for one pitch, as shown in FIG. 11G. A frame size signal 12a is then recorded at a position which is separated by a constant distance from a hole 19, and in this embodiment that distance is about 6.28 mm. The frame size signal may be detected by the printer using the known positional relationship between hole 19 and the frame size signal. FIG. 11H shows a photographic film 1 as it would be exposed when switching from the HDTV-matched full format to the NTSC-matched full format. In FIG. 11H the frame size signal 12a and the NTSC and HDTV frames 3 are recorded in a center of the pitches between successive holes 19.

FIG. 11H, FIG. 11I and FIG. 11J all show other recording formats for the frame size signal. These three formats can be used in both directions of the film feeding of the camera. For example, one camera feeds a film 1 from a cartridge housing to a film housing after exposing a frame 3 of the subject on a film 1. Another camera feeds the film back from the film housing to the cartridge housing after exposing the film. For both types of camera, a frame size signal 12a and a frame 3 can be exposed at a position which is a constant distance from the holes 19 on both sides of the frame 3.

FIG. 11I and FIG. 11J show a combination of two different hole pitches which are a short distance and a long distance. FIG. 11I shows a format where a frame size signal 12a is exposed on a right side of a frame 3 and is a known constant distance away from the holes 19 on both sides. FIG. 11J shows a format where a frame size signal 12a is exposed on a left side of a frame 3 and is a constant distance away from the holes on both sides.

As shown in FIGS. 11A through 11J, the system controller of the photographic camera controls the feeding of the photographic film 1 such that the photographic film 1 will not be exposed in overlapping frames, even when different frame sizes are successively exposed.

The procedure described in relation to FIGS. 11A–11E applies equally to the magnetic marks 19' present on the film shown in FIGS. 4A and 4B.

FIGS. 1 and 2 illustrate the photographic film 1 whose effective exposure areas have been exposed in frames 3 of different sizes. In FIG. 1, the photographic film 1 has been exposed in an HDTV-matched full-frame size, having a width of 30 mm, a length of 53.3 mm, and aspect ratio of 9:16, and in an NTSC-matched full-frame size, having a width of 30 mm, a length of 40 mm) whose aspect ratio is 3:4. The holes 19 defined along the upper marginal edge of the photographic film 1 have a pitch of 5.25 mm.

In FIG. 2, the photographic film 1 has also been exposed in an HDTV-matched full-frame size and an NTSC-matched full-frame size, however, unlike FIG. 1, the holes 19 defined in the upper marginal edge of the photographic film 1 have a pitch of 6.28 mm. In FIG. 2, one frame of an HDTV-matched full-frame size corresponds to nine pitches of the holes 19, and one frame of an NTSC-matched full-frame size corresponds to seven pitches of the holes 19. Since these pitches are odd-numbered, a hole 19 may be positioned in alignment with the center of the frame, so that the center of the frame can easily be detected.

As shown in FIGS. 5 and 8, the photographic camera has a shutter release button 37. When the shutter release button 37 is depressed, the system controller 8 controls the size of the exposure area and supplies a control signal to a mark recording circuit 38 for recording a central mark, a so-called effective exposure area position signal, indicative of the center of the frame 3 and also supplies a control signal to a frame number recording circuit 39 for recording a frame number. The mark recording circuit 38 energizes an LED 40 positioned at the lower film-guide pair 30, 31 for recording a central mark 40a, shown in FIGS. 1 and 2, representing the center of the exposed frame 3. The frame number recording circuit 39 energizes an LED 41 positioned at the lower film guide pair 30, 31 for recording a frame number 41a, shown in FIGS. 1 and 2, representing the frame number of the exposed frame 3. The frame number 41a can be recorded such that it agrees with an actual frame number.

Figure 12:
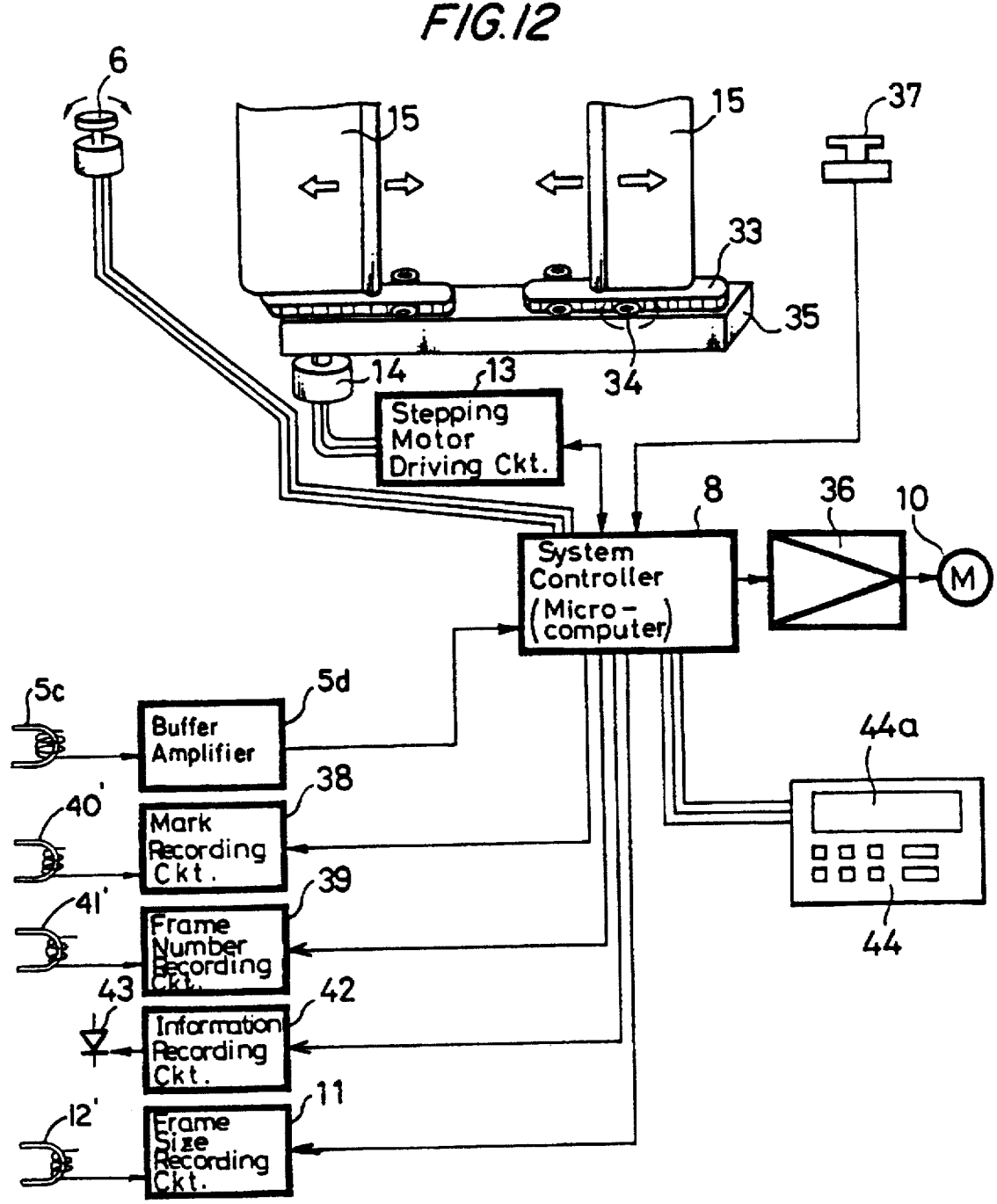
FIG. 12 is a block diagram of a control system for the other embodiment of the 35-mm photographic camera according to the present invention using the film of FIGS. 4A and 4B.

Alternatively, as shown in FIG. 12 in place of LED 40 a magnetic head 40' can be employed to record the center mark on the marginal area 19" on the unexposed film. Similarly, the frame number can be recorded using another magnetic head 41'.

The system controller 8 also supplies a control signal to a frame size recording circuit 11 for recording a frame size signal, a so-called effective exposure area width signal, indicative of the frame size of the exposed frame 3. The frame size recording circuit 11 energizes an LED 12 positioned at the lower film guide pair 30, 31 for recording a frame size signal 12a, shown in FIGS. 1 and 2.

Alternatively, as shown in FIG. 12, in place of LED 12 a magnetic head 12' can be employed to record the frame size signal on the marginal area 19" on the unexposed film.

The magnetic head 5c that senses the magnetic marks 19' on the film shown in FIGS. 4A and 4B is connected to the system controller 8 through a buffer amplifier 5d or a similar playback amplifier.

The LED 12 may be composed of four LED elements which are selectively energized to record one of the frame size signals 12a, which represent the frame size set by the frame size setting switch 6. The various frame size signals 12a are shown by way of example in Table 2 below and are known as aspect signals.

TABLE 2

| Frame Size | Frame size signal 12a |
|---|---|
| HDTV-matched full-frame size | IIII |
| NTSC-matched full-frame size | III |
| NTSC-matched half-frame size | II |
| HDTV-matched half-frame size | I |

The central mark 40a and the frame size signal 12a supply information regarding the frame position and the frame size to an automatic printer, described hereinbelow, for controlling the automatic printer when the exposed and processed film is printed.

While frame sizes can be recognized by measuring the distances between adjacent central marks 40a when the exposed film is printed, the processing speed of the automatic printer can be increased by using the frame size signal 12a.

At the same time that the photographic film 1 is exposed, the system controller 8 supplies an information signal to an information recording circuit 42 for recording desired information. The information recording circuit 42 energizes an LED 43 positioned at the upper film guide pair 30, 31 for recording such information 43a on the lower marginal edge, shown in see FIGS. 1 and 2, of the photographic film 1. The information 43a may be information that is supplied from the camera lens and the camera itself upon exposure or could consist of the exposure date, the person who took the picture, an exposure condition, or other information that the user has entered through an input device 44, such as a keypad, on the outer surface of the rear lid of the camera body 10. The amount of information 43a, that is, the number of characters that can be recorded, is dependent upon the frame size, and is displayed on a display panel 44a of the input device 44. The LED 43 has a number of LED elements that are selectively energized depending on the frame size.

An analysis has been made to determine the optimum position where the information 43a should be recorded and the optimum position where the holes 19 or magnetic marks 19' are defined from the standpoints of the user's convenience and a psychological effect that those positions have on the user. The results of the analysis are as follows:

(1) If marginal edges outside of the effective exposure area of the film are available as a band for recording user's information, then the information should more preferably be positioned on the lower marginal edge of the print paper, rather than on the upper marginal edge.

(2) Study of the developing and printing processes in processing laboratories indicates that in many cases information about the film itself is printed in many cases on film negatives, such that the film information will be positioned on the upper marginal edge of the print paper. It is preferable not to mix the film information and the band for recording user's information.

From the above results, it is preferable to position the film position detecting holes 19 upwardly of the effective exposure area of the film when it is exposed.

As described above with reference to FIGS. 5 through 8, the photographic camera according to the present invention has a detecting means 5a, 5b for detecting the feeding of the photographic film 1, a film control system 8, 9, 10 for controlling the distance by which the photographic film 1 moves and for driving the photographic film 1 for a length corresponding to the width of the selected exposure opening 7, based on a detected signal from the detecting means 5a, 5b, and for controlling a signal recording device 8, 11, 12, 38, 40 disposed near the exposure opening 7 for recording a signal indicative of the position of the exposure opening 7 on the photographic film 1 when the photographic film 1 is exposed through the exposure opening 7.

After the photographic film 1 is exposed using the photographic camera, the processed photographic film 1 bears control signals that are recorded in a signal recording area 21, shown in see FIG. 1, thereof and that will be used when the photographic film 1 is printed. Therefore, even if the developed photographic film 1 contains frames of different frame sizes, it can be automatically printed by an automatic printer without requiring individual adjustment.

The photographic camera according to the present invention also has a film control system 8, 9, 10 for controlling the feeding or driving of the photographic film 1, and an opening control system 8, 13, 14, 15 for varying the width of the exposure opening 7 along the photographic film 1. At least when the width of the exposure opening 7 changes from a smaller dimension to a larger dimension, the film control system 8, 9, 10 drives the photographic film 1 for a length corresponding to the selected width of the exposure opening 7.

Therefore, the width of the exposure opening 7 is variable, and the take-up or driving of the photographic film 1 is controlled depending on the width of the exposure opening 7. The photographic camera can expose the photographic film 1 successively in desired frame sizes which may differ one from another without adjacent frames overlapping each other.

As shown in FIG. 1, the photographic film 1 used in the photographic camera according to the present invention has a signal recording area 21 located between an effective exposure area 20 and a marginal edge thereof for magnetically or optically recording control signals, which will be used when the photographic film 1 is processed and printed. The film 1 has holes 19 or magnetic marks 19' defined in an upper marginal edge area thereof between the effective exposure area 20 and the marginal edge for detecting the distance by which the photographic film 1 has been moved.

Figure 13:
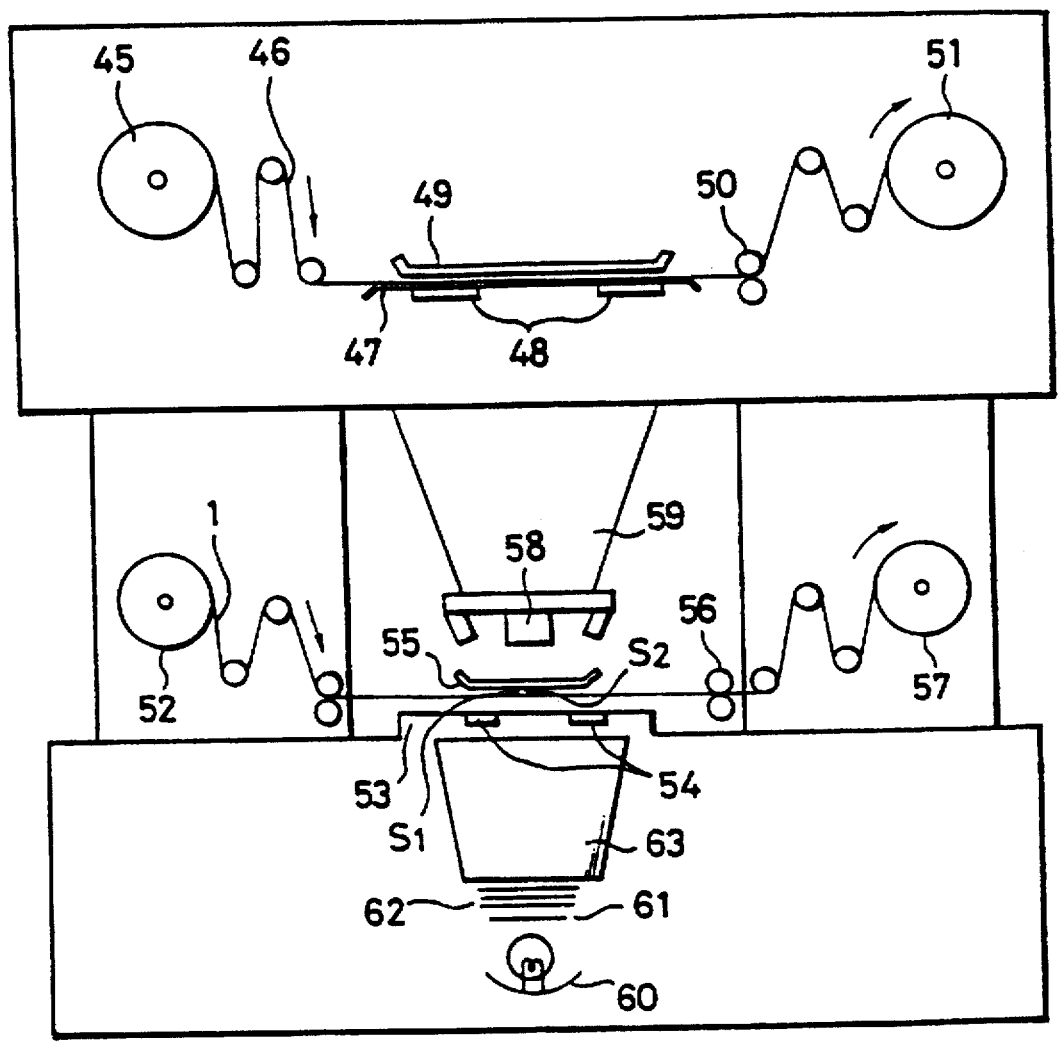
FIG. 13 is an elevational view of an automatic printer for printing on photosensitive paper a processed 35-mm film that was exposed using the embodiment of the 35-mm photographic camera according to the present invention.

As shown in FIG. 13, an automatic printer for automatically printing processed photographic film 1 that has been exposed using a camera as described above has a printer body that supports a paper supply reel 45 for supplying the sensitized print paper 46, a paper deck or platen 47 for supporting the print paper 46 supplied from the paper supply reel 45, a variable paper mask 48 for determining the size of a print paper segment on which an image is to be printed, a paper holder plate 49 for holding the print paper 46 down against the paper deck 47, a paper feed or drive roller 50 for driving the print paper 46, and a paper takeup reel 51 for winding the exposed print paper 46.

The printer body of the automatic printer also supports a film supply reel 52 for supplying the processed photographic film 1, a film deck or platen 53 for supporting the photographic film 1 supplied from the film supply reel 52, a negative-carrier variable slit 54, a negative holder plate 55 for positioning the negative down against the film deck 53, a film feed or drive roller 56 for driving the photographic film 1, a film takeup reel 57 for winding the exposed and processed photographic film 1, a lens 58 positioned above the negative holder plate 55, a bellows 59 supporting the lens 58 and positioned below the paper deck 47, a lamp 60 disposed below the film deck 53, a black shutter 61 positioned above the lamp 60, a filter assembly 62 composed of yellow, magenta, and cyan (Y, M, C) filters, and a diffusion box 63 disposed between the filter assembly 62 and the film deck 53.

The negative holder plate 55 supports a frame size sensor S1 for detecting the frame size signal 12a recorded on the photographic film 1 and a frame center sensor S2 for detecting the central mark 40a recorded on the photographic film 1 that indicates the center of a frame.

Upon detection of the central mark 40a of the frame 3 with the frame center sensor S2; the film drive roller 56 is controlled to drive the film to align the frame center with the center of the negative-carrier variable slit 54. The variable paper mask 48 and the negative-carrier variable slit 54 are controlled based on the frame size signal 12a that is detected by the frame size sensor S1.

Figure 18A:
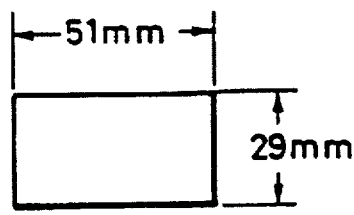
FIGS. 18A and 18B are representative of the relative sizes of negative-carrier variable slits in the automatic printer.
Figure 18B:
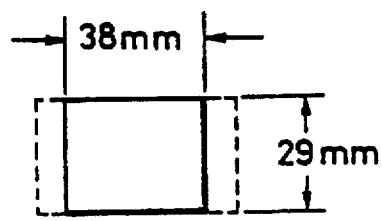
Figure 19A:
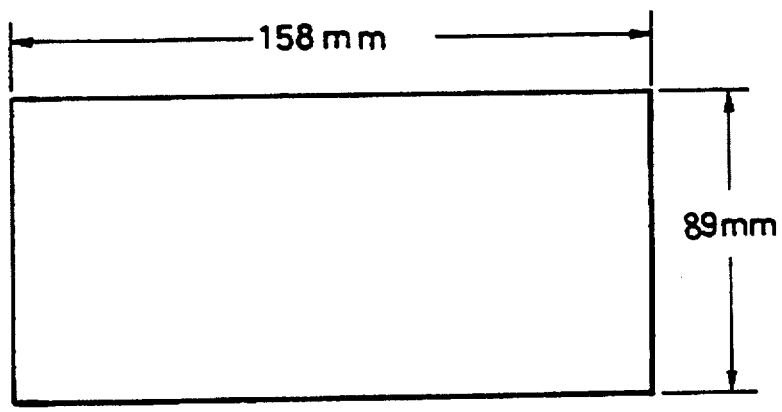
FIGS. 19A and 19B are representations showing the relative sizes of variable paper masks in the automatic printer.
Figure 19B:
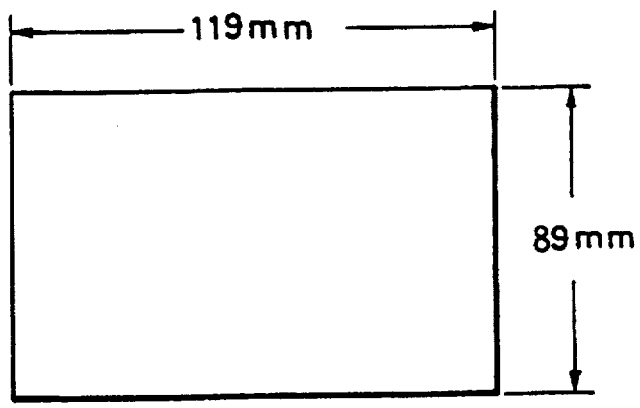

If the frame size is an HDTV-matched frame size, for example, the negative-carrier variable slit 54 is set to dimensions as shown in FIG. 18A, and the variable paper mask 48 is set to dimensions as shown in FIG. 19A. If the frame size is an NTSC-matched frame size, for example, the negative-carrier variable slit 54 is set to dimensions as shown in FIG. 18B, and the variable paper mask 48 is set to dimensions as shown in FIG. 19B.

Figure 14:
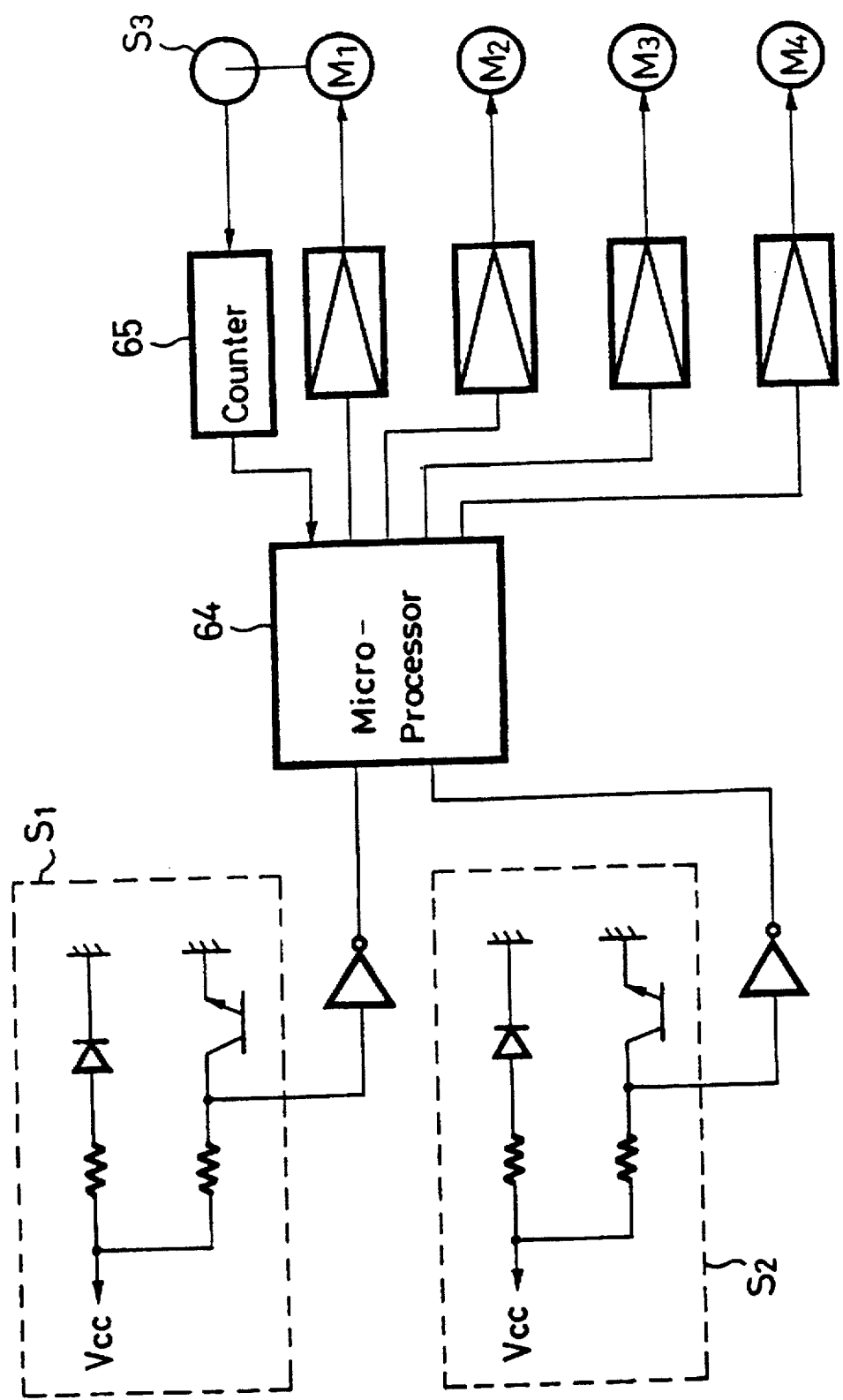
FIG. 14 is a block diagram of a control system used in the embodiment of the automatic printer shown in FIG. 13.

A control system for the automatic printer is shown in FIG. 14, in which the frame size sensor S1 and the frame center sensor S2 comprise photocouplers, respectively, for detecting the frame size signal 12a and the central mark 40a, respectively, that are recorded in the marginal edge area of the photographic film 1.

Figure 15:
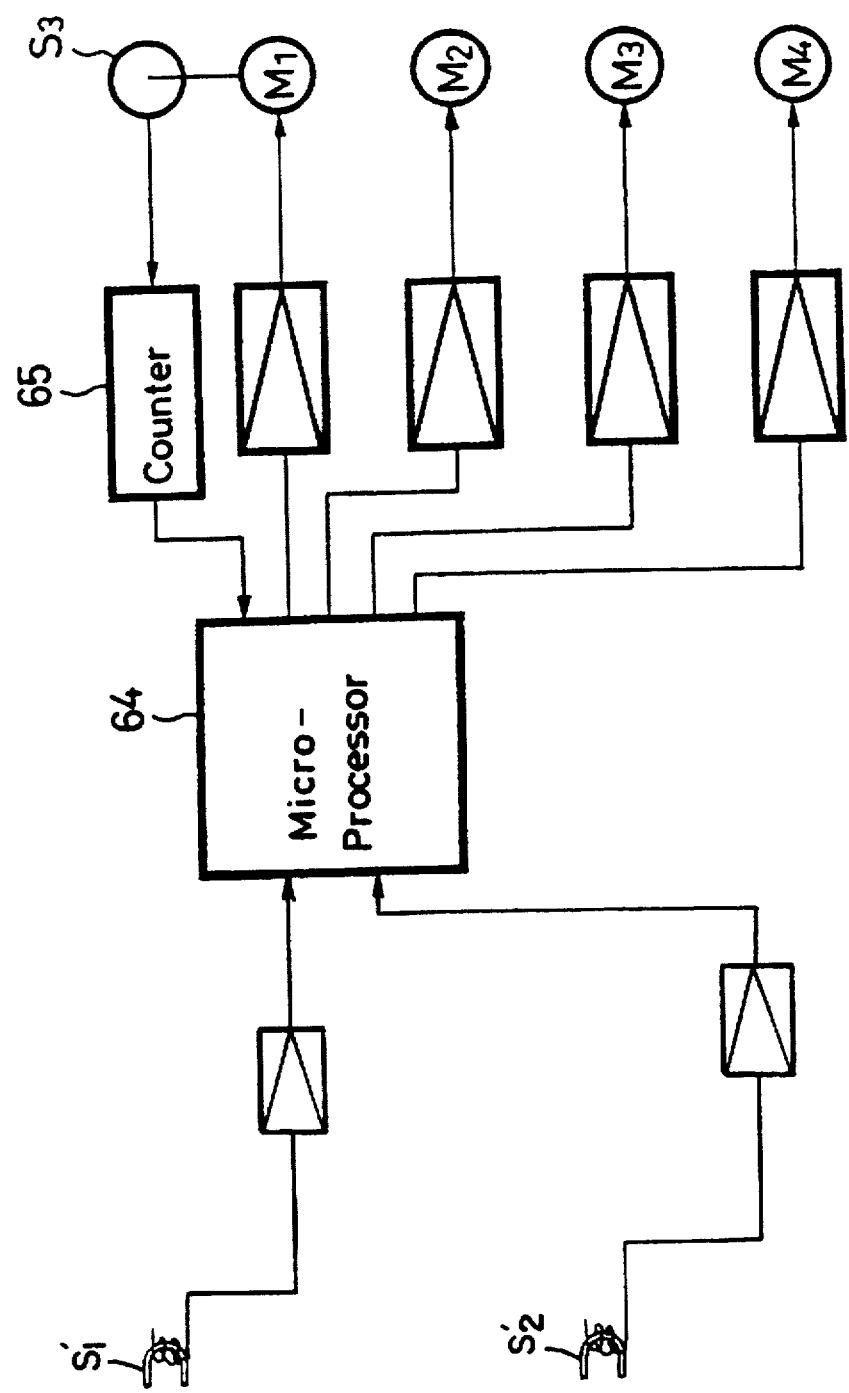
FIG. 15 is a block diagram of a control system for another embodiment of the printer according to the present invention.

On the other hand, the optical sensors S1 and S2 may be comprised of respective magnetic heads S1' and S2', as shown in FIG. 15, that read the frame size signal and the frame center signal that are magnetically recorded on the marginal area 19" of the unexposed film.

The frame center is determined based on the central mark 40a detected by the frame center sensor S2, and the frame size of the frame 3 whose frame center is determined by a microprocessor 64 of the control system based on the frame size signal 12a that is read by the frame size sensor S1 before the central mark 40a is detected by the frame center sensor S2. Then, the microprocessor 64 controls a mask size drive motor M3 to actuate the variable paper mask 48 to conform with the determined frame size. At the same time, the microprocessor 64 controls a negative-carrier variable slit drive motor M2 to actuate the negative-carrier variable slit 54.

Based on the frame size signal 12A read by the frame size sensor S1, the microprocessor 64 controls a film feed motor M1 to rotate the film feel roller 56 for feeding the photographic film 1 for a predetermined length. At the same time, the microprocessor 64 controls a paper feed motor M4 to rotate the paper feed roller 50 for thereby feeding the print paper 46 for a predetermined length.

Figure 16C:
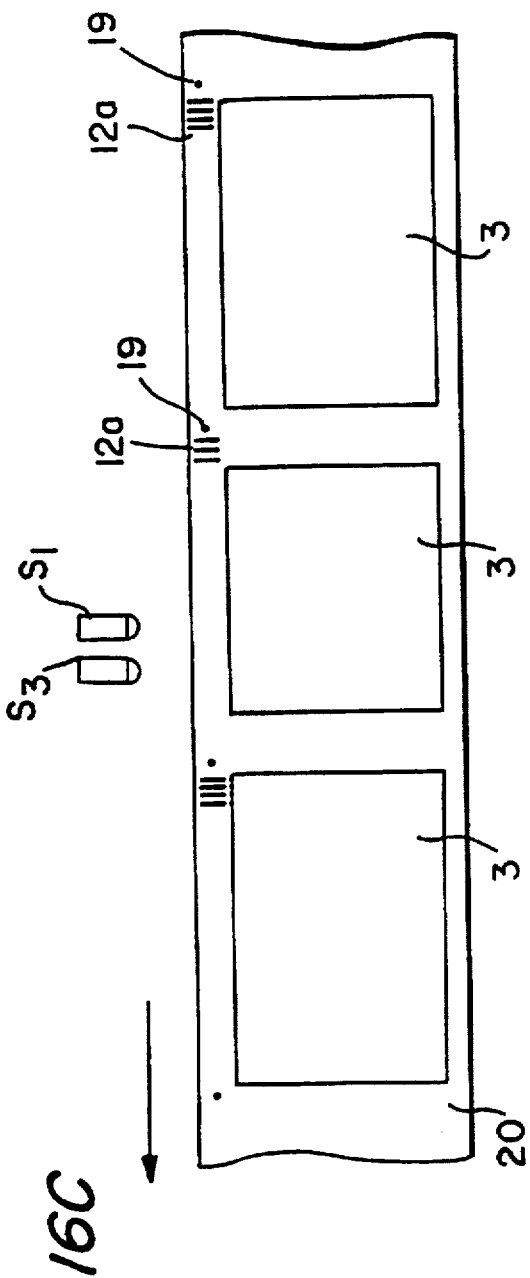
Figure 16D:
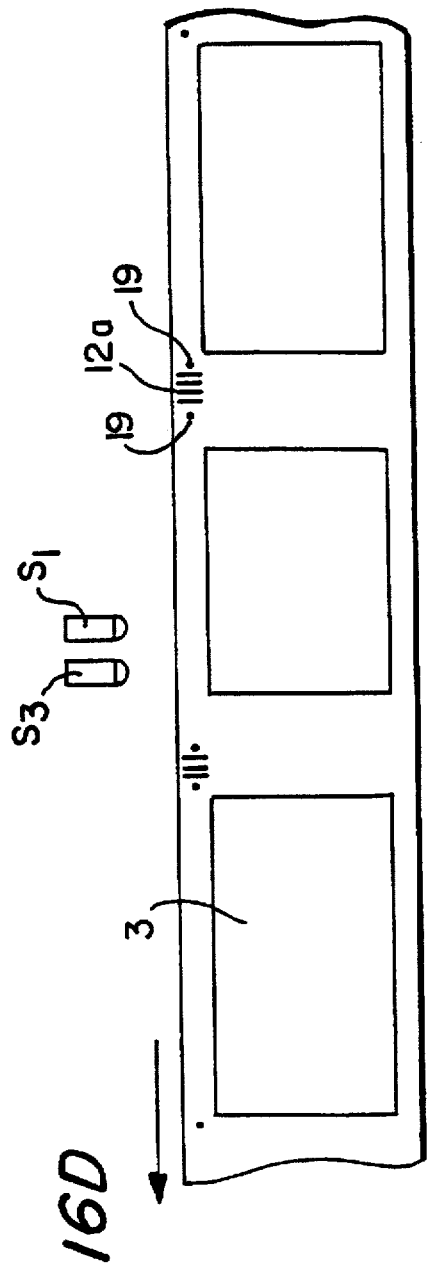

FIGS. 16A and 16B show the relationship between the photographic film 1, the frame center sensor S2, and the frame size sensor S1 in the automatic printer. FIGS. 16C and 16D show the relationship between the photographic film 1, the hole sensor S3, and the frame size sensor S1 in another type automatic printer for a film 1, for using the format shown in FIGS. 11F through 11J. When the photographic film 1 is driven in the direction indicated by the arrow A in FIG. 16A, a frame size indicator 12a is detected by the frame size sensor S1 before its frame 3 is positioned and the sensor S1 output signal is used for controlling the driving of the photographic film 1, the negative-carrier variable slit 54, and the variable paper mask 48. The frame size signal from sensor S1 is processed by the microprocessor 64, which determines the frame size when the frame center of the frame 3 is determined by the frame center sensor S2 or by the hole sensor S3.

As shown in FIGS. 16A and 16B, the central mark 40A indicative of a frame center is recorded at each frame on the photographic film 1. At each frame, the frame size indicator 12a is recorded ahead of the central mark 40a, and the frame number 41a is recorded behind the central mark 40a with respect to the direction in which the photographic film 1 is driven.

While the frame center sensor S2 and the frame size sensor S1 are shown as being located in substantially the same position, only the frame center sensor S2 should be positioned in alignment with the center of the negative-carrier variable slit 54 and the variable paper mask 48, and the frame size sensor S1 may be positioned on the film deck 53 at the entrance end thereof. This applies to the magnetic head sensors S1' and S2' as well.

As shown in FIGS. 16C and 16D, the frame size signal 12a is recorded at each frame on the photographic film 1. The frame size signal 12a and the frame 3 are located a constant distance away from a hole 19. Using the known relationships of the distance from the hole 3 to the frame size signal 12 and the frame 3 the frame center can be found. Thus, the size of the frame 3 whose center is found is determined by the microprocessor 64 of the control system based on the frame size signal 12a, which is read by the frame size sensor S1, before the hole 19 is detected by the hole sensor S3, as shown FIGS. 16C and 16D. In FIG. 16D the frame size sensor S1 and the hole sensor S3 may be exchanged in place based on the control sequence of the microprocessor 64.

Figure 17A:
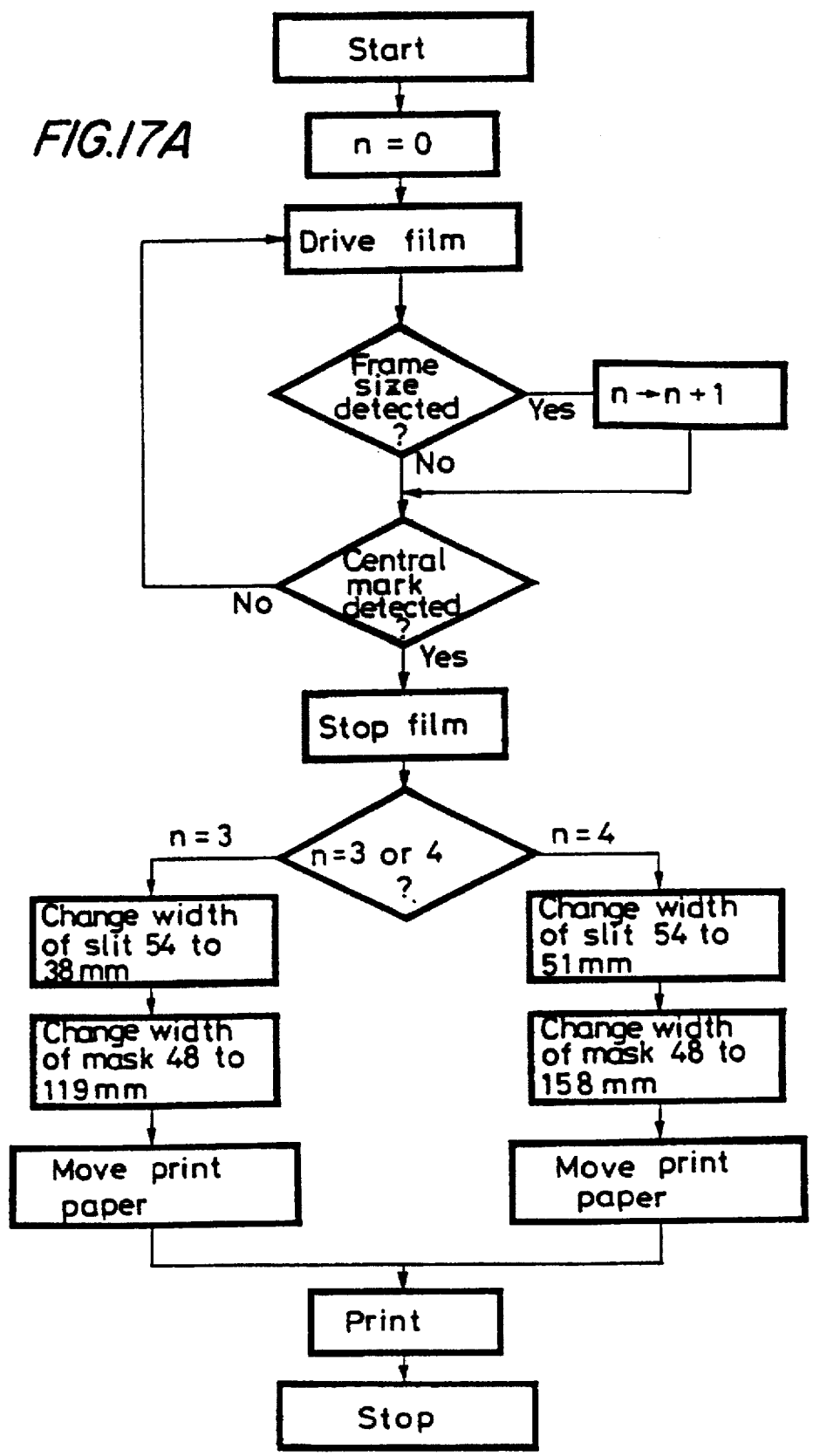

FIG. 17A shows a control sequence of the microprocessor 64 for controlling the driving of the developed photographic film or negative 1 and the driving of the print paper 46. The negative-carrier variable slit 54 and the variable paper mask 48 are also controlled in this control sequence. The photographic film 1 is continuously driven and taken up until the central mark 40a is detected by the frame center sensor S2, and then the photographic film 1 is stopped when the central mark 40a is detected by the frame center sensor S2. Until the photographic film 1 is stopped, the frame size indicator 12a is detected by the frame size sensor S1 and its number is counted.

If the frame size indicator 12a represents "3", the width of the negative-carrier variable slit 54 is set to 38 mm, and the width of the variable paper mask 48 is set to 119 mm. Thereafter, the print paper 46 is moved, and the photographic film 1 is printed, after which the control sequence is ended. The print paper 46 is moved for a distance corresponding to printed frame sizes, a blank surrounding the printed frames, and a cutting blank between the printed frames. Usually, a hole is defined in the cutting blank when the photographic film 1 is printed, and serves as a positional signal for automatically cutting the print paper.

If the frame size indicator 12a represents "4", the width of the negative-carrier variable slit 54 is set to 51 mm, and the width of the variable paper mask 48 is set to 158 mm. Thereafter, the print paper 46 is moved, and the photographic film 1 is printed, after which the control sequence is ended.

If the frame size indicator 12a represents "1" or "2", the widths of the negative-carrier variable slit 54 and the variable paper mask 48 are set similarly. Thereafter, the print paper 46 is moved, and the photographic film 1 is printed, after which the control sequence is ended.

Since the frame size indicator 12a is recorded in the upper marginal edge portion of the photographic film 1, it may possibly be recognized in error as the central mark 40a. To avoid such an error, a negative feed sensor S3, shown in FIG. 14, for detecting the distance by which the photographic film 1 is fed is associated with the film feed motor M1, and the distance by which the photographic film 1 is fed is measured by a counter 65 whose count is fed back to the microprocessor 64. Since the width of the frame size indicator 12a on the photographic film 1 can be detected by the distance by which the photographic film 1 is driven, the frame size indicator 12a can be distinguished from the central mark 40a or the frame number 41a.

FIG. 17B shows a control sequence of the microprocessor 64 for the photographic film formats shown in FIGS. 11F through 11J. This control sequence is used for the printer as shown in FIGS. 16C and 16D. The photographic film 1 is continuously fed until the hole 19 is detected by the hole sensor $S_3$ and the frame size signal 12a is detected by the frame size sensor $S_1$. Until the photographic film 1 is stopped, the frame size signal 12a is detected by the frame size sensor $S_1$ and its number is counted. After the photographic film is stopped, a control sequence of the microprocessor 64 is the same sequence as shown in FIG. 17A.

As described above with reference to FIGS. 13, 14, and 16A–16D, the automatic printer according to the present invention has a film drive control device 65, 64, M1 for detecting an effective exposure area position indicator 40a recorded in a marginal edge area between the effective exposure area 20 on the photographic film 1 and the marginal edge thereof to control the driving of the photographic film 1, and a printing opening width control device 54, 64, M2 for detecting an effective exposure area width indicator 12a recorded in the marginal edge area to control the width of the printing opening along the photographic film 1.

The photographic film 1 has an effective exposure area position indicator 40a and an effective exposure area width indicator 12a which are recorded in a marginal edge area between the effective exposure area 20 on the photographic film 1 and the marginal edge thereof. After the effective exposure area width indicator 12a has been detected, the effective exposure area position indicator 40a is detected. The width of the film exposure opening along the photographic film 1, the width of the print paper exposure opening, and the distance by which the print paper 46 is driven are controlled based on the detected effective exposure area width indicator 12a, and the distance by which the photographic film 1 is fed is controlled based on the detected effective exposure area position indicator 40a.

Therefore, since the distance by which the photographic film 1 is driven is controlled based on the effective exposure area position indicator 40a recorded in the marginal-edge area of the photographic film 1 and the width of the printing opening, the width of the print paper exposure opening and the distance over which the print paper 46 is driven are controlled based on the effective exposure area width indicator 12a recorded in the marginal edge area of the photographic film 1, the photographic film 1 can automatically be printed even if it has a succession of frames of different sizes.

Figure 20A:
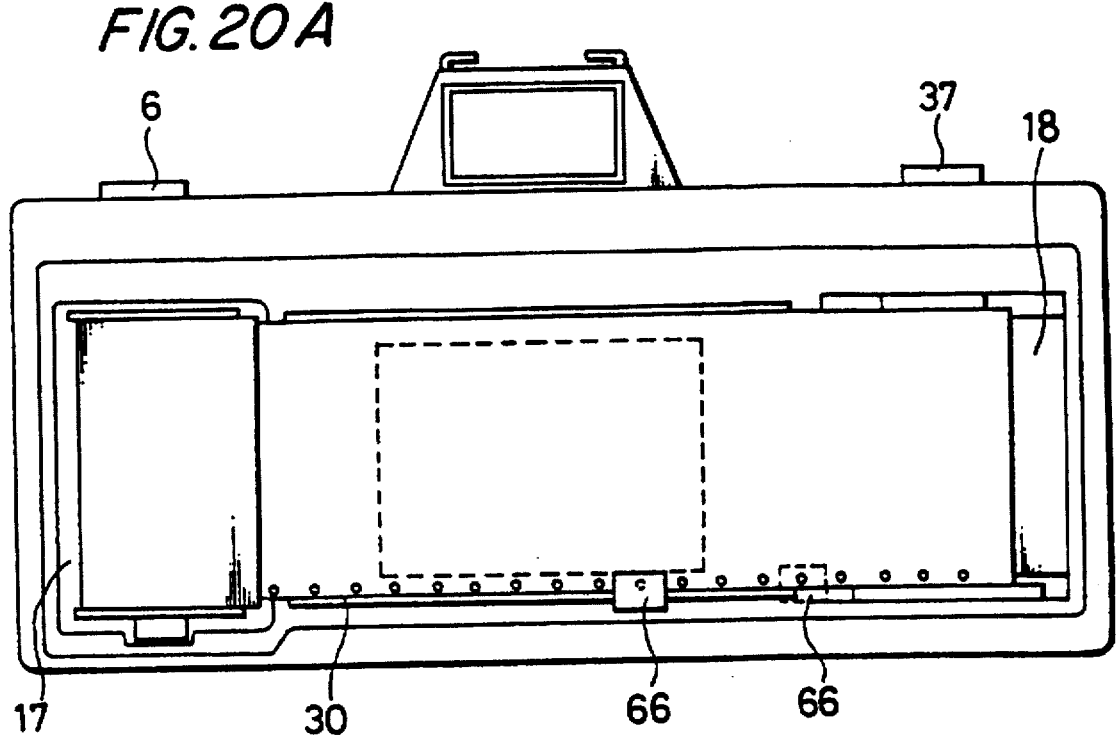
FIGS. 20A through 20C are rear elevational views of a 35-mm photographic camera with a rear lid removed, according to another embodiment of the present invention.
Figure 21:
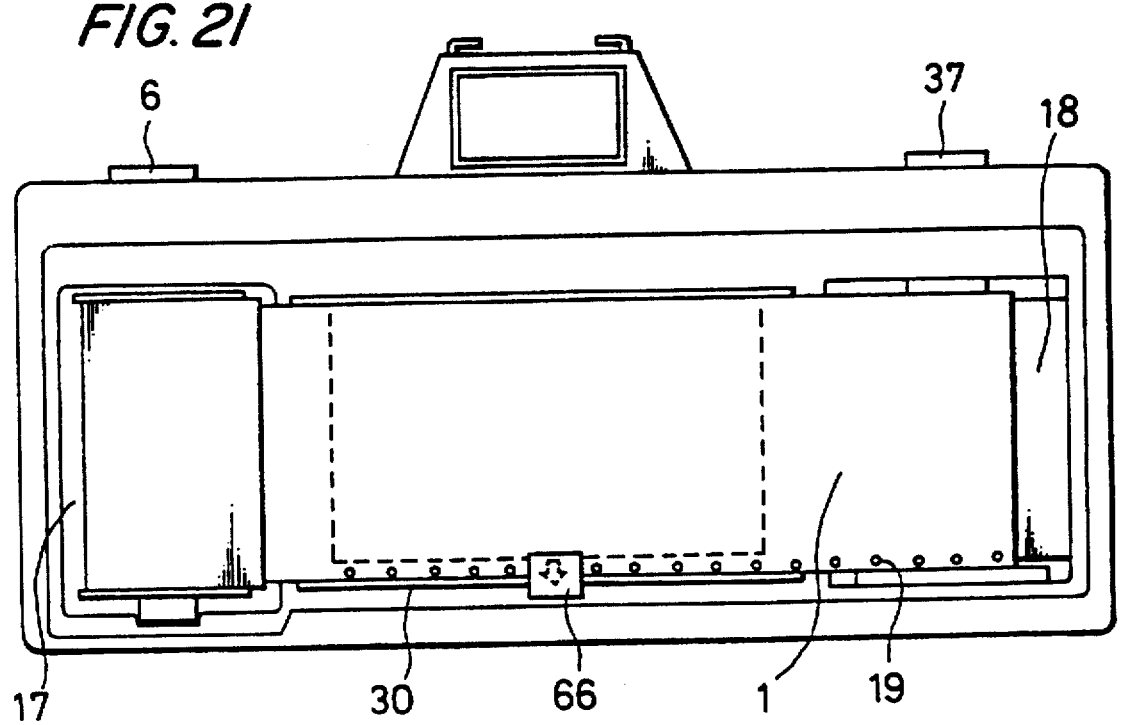
FIG. 21 is a rear elevational view of a 35-mm photographic camera with a rear lid removed, according to still another embodiment of the present invention.

In the illustrated photographic camera, the LED 5a and the photodetector 5b are disposed in confronting relationship to each other for detecting the film position detecting holes 19, however, as shown in FIGS. 20A and 21, a photocoupler 66, which is an integral combination of an LED and a photodetector for detecting a film position, may be disposed on a film guide 30. The photocoupler 66 may be positioned anywhere on the film guide 30. The photocoupler 66 may have LEDs 41, 40, as shown in FIG. 5, for recording the frame number 41a and the central mark 40a at the same time that the frame is exposed.

Figure 20B:
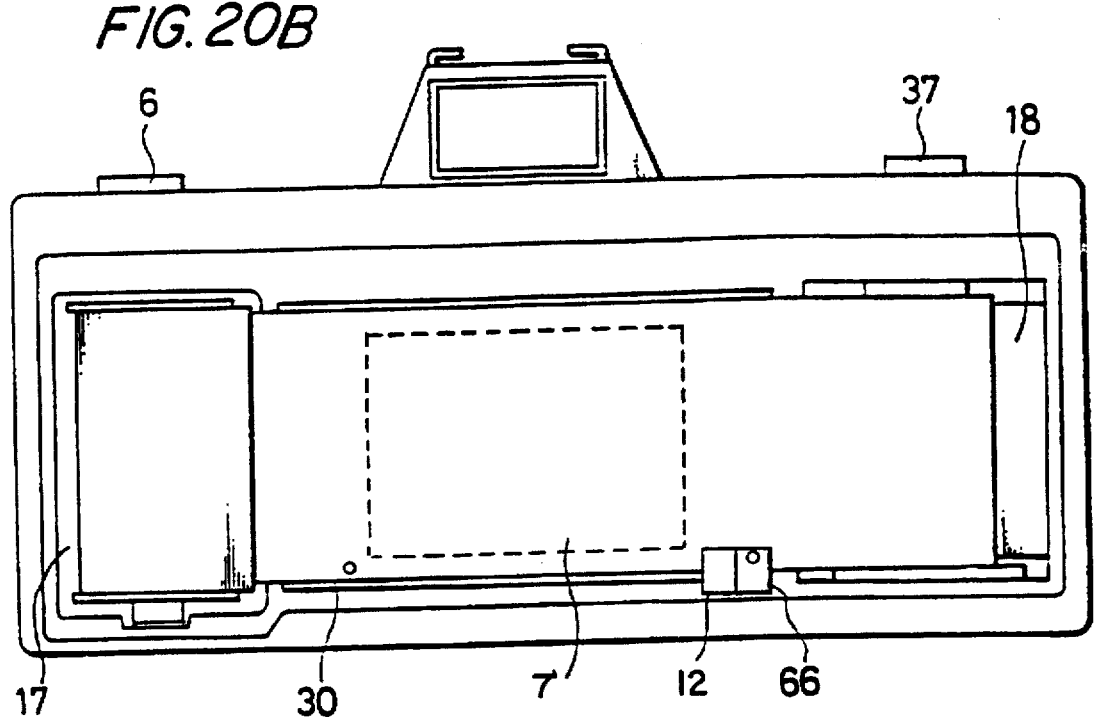

FIG. 20B shows the photographic camera having a photocoupler 66 for detecting a film position and a LED 12 for recording a frame size signal. The camera has two variable masks on both sides of the exposure opening 7' and exposes a frame of the subject on the film 1 as shown FIG. 11G. Similarly, a frame of the subject is exposed on the film 1 as shown in FIGS. 11H and 11I corresponding to the position of the photocoupler 66 and a LED 12.

Figure 20C:
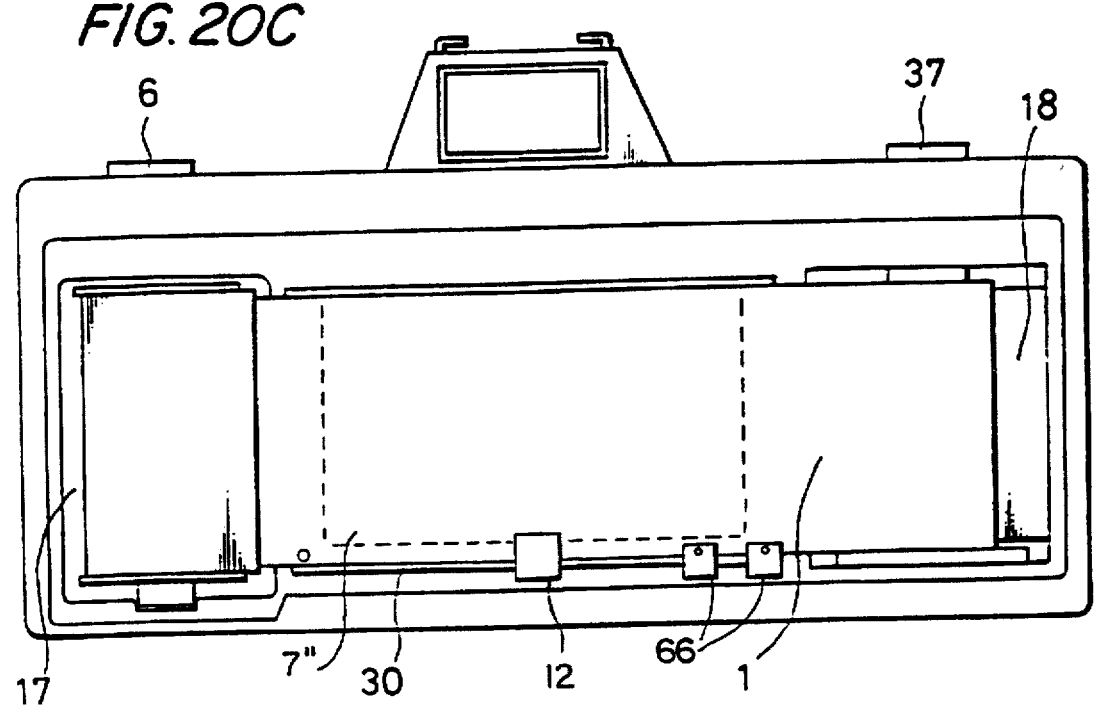

While the hole sensor 5 comprises an LED and a photodetector in the illustrated photographic camera, the hole sensor 5 may comprise two pairs of an LED and a photodetector given the different distances by which frames of different sizes are fed. A camera having two pairs of an LED and a photodetector is shown in FIG. 20C and an exposed frame of the subject is shown in FIG. 11F. This camera has two variable masks on both sides of the exposure opening 7".

In the illustrated automatic printer, the same photographic film contain frames of different sizes, however, the present invention is also applicable to an automatic printer for automatically printing a spliced length of photographic films With different frame sizes.

The present invention uses an exposure control signal magnetically or optically recorded between an edge of the photographic film and an effective exposure area of the photographic film. This signal can be used not only by the processor but also by the user, and the user can print by a simple printer system according to the present invention. This simple home system can be combined with a computer system or a television for display. Also, an exposure control signal of the present invention may include an auxiliary signal for controlling a printer system or indicating certain features to the user. Thus, the present invention as described above can be used for many applications because it avoids using the punched in notch required in previously proposed systems.

In the illustrated photographic film, the frame size signal is based on an optical mark, however, the photographic film may alternatively have a transparent magnetic ink layer on the surface. The frame size signal can then be recorded as a magnetic mark on the magnetic ink layer. Thus, in the camera the frame size recording device 12 may be a magnetic head and in the printer the frame size sensor $S_1$ may be a magnetic head.

In the illustrated photographic film, the frame size signal is an optical mark or a magnetic mark as described above, however, the mark may also be a binary or analog data signal. This data signal includes error correcting data, decoder data for decoding a frame size signal or other signals, and a data synchronizing signal for accurately reading decoded data and error correcting data.

Having described preferred embodiments of the invention with reference to the accompanying drawings, it is to be understood that the invention is not limited to those precise embodiments and various changes and modifications could be effected by one skilled in the art without departing from the spirit or scope of the present invention, as defined in the appended claims.

What is claimed is:

1. A photographic system comprising:
   a photographic camera including
      a camera body,
      a first housing disposed in said camera body for housing a photographic film cartridge containing a photographic film,
      a second housing disposed in said camera body for housing said photographic film drawn from said photographic film cartridge,
      film drive means disposed in said camera body for driving said photographic film between said first and second housings,
      recording means disposed in said camera body for recording first and second type signals in a marginal area along an edge of said photographic film in a film drive direction, said first type signal indicating aspect information and having a bar code as a first recording pattern and said second type signal indicating a frame number and having a second recording pattern other than a bar code; and
   a photographic film printer for printing on photosensitive paper a processed photographic film photographed using said photographic camera, said printer including
      a printer body,
      light source and mask means for exposing said photosensitive paper,
      detecting means disposed in said printer body for detecting said first and second type signals recorded in said processed photographic film,
      processed photographic film drive means disposed in said printer body for driving said processed photographic film,
      logic circuit means for determining whether a signal detected by said detecting means is said first type signal indicating said aspect information or said second type signal indicating said frame number, and
      printing means disposed in said printer body for printing an image of a subject exposed on said processed photographic film onto said photosensitive paper, said printing means controlled by said logic circuit means.

2. A photographic system according to claim 1, wherein said detecting means detects a distance said processed photographic film is driven by said processed photographic film drive means, and
   said logic circuit means distinguishes said first type signal and said second type signal by analyzing said first and second recording patterns.

3. A photographic system according to claim 1, wherein said logic circuit means determines whether a signal detected by said detecting means is of a first preset format or a second preset format depending on whether said signal detected by said detecting means is determined to be said first type signal or said second type signal, and
   said printing means prints said image of said subject exposed on said processed photographic film onto said photosensitive paper based on said first preset format or said second preset format determined by said logic circuit means.

4. A photographic system according to claim 1, wherein said logic circuit means includes a microprocessor for controlling a control process, said control process having a first sequence for determining whether a signal detected by said detecting means is said first type signal or said second type signal by determining whether a detected recording pattern corresponds to said first recording pattern for said first type signal or said second recording pattern for said second type signal, and said control process having a second sequence for determining whether said signal detected by said detecting means is of a first preset format or a second preset format depending on whether said signal detected by said detecting means is determined to be said first type signal or said second type signal.

5. A photographic system according to claim 1, wherein said first and second recording patterns respectively correspond to first and second recording pulses.

6. A photographic system according to claim 5, wherein said first and second recording pulses respectively correspond to first and second recording frequencies.

7. A photographic system according to claim 1, wherein said first type signal recorded by said recording means includes an aspect ratio.

8. A photographic system according to claim 7, wherein said logic circuit means determines whether said signal detected by said detecting means includes said aspect signal based on whether said signal detected by said detecting means is determined to be said first type signal or said second type signal.

9. A photographic system according to claim 1, wherein said recording means is a magnetic recording means.

10. A photographic system according to claim 1, wherein said recording means is an optical recording means.

11. A photographic camera, comprising:
a camera body;
a first housing disposed in said camera body for housing a photographic film cartridge containing a photographic film;
a second housing disposed in said camera body for housing said photographic film drawn from said photographic film cartridge;
film drive means disposed in said camera body for driving said photographic film between said first and second housings; and
recording means disposed in said camera body for recording first and second type signals in a marginal area along an edge of said photographic film in a film drive direction, said first type signal indicating aspect information and said second type signal indicating a frame number, wherein said first type signal has a bar code as a first recording pattern and said second type signal is formed of a second recording pattern other than a bar code.

12. A photographic camera according to claim 11, wherein said recording means selectively records said first and second type signals, said first type signal including an aspect ratio.

13. A photographic camera according to claim 11, wherein said first and second recording patterns respectively correspond to first and second recording pulses.

14. A photographic camera according to claim 13, wherein said first and second recording pulses respectively correspond to first and second recording frequencies.

15. A photographic printer for printing on photosensitive paper a processed photographic film, said photographic printer comprising:

a printer body;
light source and mask means for exposing said photosensitive paper;
processed photographic film drive means disposed in said printer body for driving said processed photographic film, said processed photographic film having recorded thereon in a marginal area along an edge of said processed photographic film a first type signal indicating aspect information and a second type signal indicating a frame number, said first type having a bar code as a first recording pattern and said second type signal formed of a second recording pattern other than a bar code;
detecting means disposed in said printer body for detecting said first and second type signals recorded in said marginal area along said edge of said processed photographic film;
logic circuit means for determining whether a signal detected by said detecting means is said first type signal or said second type signal based on a difference between said first and second recording patterns; and
printing means disposed in said printer body for printing an image of a subject exposed on said processed photographic film onto said photosensitive paper, said printing means controlled by said logic circuit means.

16. A photographic printer according to claim 15, wherein said detecting means detects a distance said processed photographic film is driven by said processed photographic film drive means, and
said logic circuit means distinguishes said first type signal and said second type signal by analyzing said first and second recording patterns.

17. A photographic printer according to claim 15, wherein said logic circuit means determines whether a signal detected by said detecting means is of a first preset format or a second preset format depending on whether said signal detected by said detecting means is determined to be said first type signal or said second type signal, and
said printing means prints said image of said subject exposed on said processed photographic film onto said photosensitive paper based on said first preset format or said second preset format determined by said logic circuit means.

18. A photographic printer according to claim 15, wherein said logic circuit means includes a microprocessor for controlling a control process, said control process having a first sequence for determining whether a signal detected by said detecting means is said first type signal or said second type signal by determining whether a detected recording pattern corresponds to said first recording pattern for said first type signal or said second recording pattern for said second type signal, and said control process having a second sequence for determining whether said signal detected by said detecting means is of a first preset format or a second preset format depending on whether said signal detected by said detecting means is determined to be said first type signal or said second type signal.

19. A photographic printer according to claim 15, wherein said detecting means is a magnetic detecting means.

20. A photographic printer according to claim 15, wherein said detecting means is an optical detecting means.

21. A photographic printer according to claim 15, wherein said first and second recording patterns respectively correspond to first and second recording pulses.

22. A photographic printer according to claim 21, wherein said first and second recording pulses respectively correspond to first and second recording frequencies.

23. A photographic camera, comprising;

a camera body;

a first housing disposed in said camera body for housing a photographic cartridge containing a photographic film;

a second housing disposed in said camera body for housing said photographic film drawn from said photographic cartridge, said photographic film being devoid of sprocket holes and having an effective exposure area and two marginal areas along respective edges of said photographic film, wherein a first of said two marginal areas has position detecting holes;

film drive means disposed in said camera body for driving said photographic film between said first and second housings;

exposure means for exposing an image of an object onto said effective exposure area of said photographic film;

position detecting means disposed in said camera body for detecting said position detecting holes in said photographic film so as to determine a position for exposing said image of said object; and recording means disposed in said camera body for recording in a second of said two marginal areas of said photographic film a first type signal indicating aspect information and a second type signal indicating a frame number, wherein said first type signal has a bar code as a first recording pattern and said second type signal has a second recording pattern other than a bar code.

* * * * *